United States Patent
Naik et al.

(10) Patent No.: US 12,539,096 B2
(45) Date of Patent: Feb. 3, 2026

(54) CORRELATING BACKGROUND SOUNDS TO FETAL HEART RATES

(71) Applicant: GE Precision Healthcare LLC, Waukesha, WI (US)

(72) Inventors: Rajendra Naik, Bangalore (IN); Nagapriya Kavoori Sethumadhavan, Bangalore (IN)

(73) Assignee: GE Precision Healthcare LLC, Waukesha, WI (US)

( * ) Notice: Subject to any disclaimer, the term of this patent is extended or adjusted under 35 U.S.C. 154(b) by 106 days.

(21) Appl. No.: 18/641,600

(22) Filed: Apr. 22, 2024

(65) Prior Publication Data

US 2025/0325245 A1    Oct. 23, 2025

(51) Int. Cl.
*A61B 8/08* (2006.01)
*A61B 5/00* (2006.01)
*A61B 8/02* (2006.01)
*A61M 21/00* (2006.01)

(52) U.S. Cl.
CPC .......... *A61B 8/0866* (2013.01); *A61B 5/7282* (2013.01); *A61B 8/02* (2013.01); *A61M 21/00* (2013.01); *A61M 2021/0027* (2013.01)

(58) Field of Classification Search
CPC ....... A61B 8/0866; A61B 8/02; A61B 5/7282; A61M 21/00; A61M 2021/0027
See application file for complete search history.

(56) References Cited

U.S. PATENT DOCUMENTS

| | | |
|---|---|---|
| 6,004,259 A | 12/1999 | Sedaros |
| 8,121,305 B2 | 2/2012 | Servello et al. |
| 2009/0161892 A1* | 6/2009 | Servello ................. H04R 1/083 381/151 |

(Continued)

FOREIGN PATENT DOCUMENTS

CN    110743075 A    2/2020

OTHER PUBLICATIONS

Abrams, R. M., & Gerhardt, K. J. (2000). The Acoustic Environment and Physiological Responses of the Fetus. Journal of Perinatology, 20(8), pp. S30-S35. (Year: 2000).*

(Continued)

*Primary Examiner* — Chao Sheng
(74) *Attorney, Agent, or Firm* — Amin, Turocy & Watson, LLP

(57) ABSTRACT

One or more systems, devices, computer-implemented methods and/or computer program products of use provided herein relate to correlating background sounds to fetal heart rates (FHRs). A system can comprise a processor that can execute computer-executable instructions stored in memory that, when executed by the processor, facilitate performance of operations comprising employing an ultrasound fetal monitoring system (FMS) to detect a plurality of periods of a defined average FHR for a fetus, correlating the plurality of periods of the defined average FHR to sounds external to a womb carrying the fetus to identify and record one or more audio patterns that can cause the plurality of periods of the defined average FHR in the fetus, and replaying the one or more audio patterns to the fetus after applying a first level of modification to the one or more audio patterns based on characteristics of the womb.

20 Claims, 10 Drawing Sheets

(56) References Cited

U.S. PATENT DOCUMENTS

2015/0250978 A1 9/2015 Pelsue et al.
2019/0313999 A1 10/2019 Kim
2020/0282176 A1 9/2020 Holsti et al.

OTHER PUBLICATIONS

EP application 25168681.2 filed Apr. 4, 2025—extended Search Report issued Sep. 10, 2025; 9 pages.

\* cited by examiner

CORRELATING BACKGROUND SOUNDS TO FETAL HEART RATES

TECHNICAL FIELD

The subject disclosure relates generally to ultrasound technology and, more specifically, to promoting neurodevelopmental care in fetuses and infants by employing prerecorded sounds patterns by correlating background sounds to fetal heart rates (FHRs).

BACKGROUND

Ultrasound fetal monitoring systems (FMSs) are used in non-stress tests for detecting (FHRs) and fetal movements and in generally monitoring fetal development. As a fetus grows in the womb, the auditory organs of the fetus also develop, and the characteristics of sounds heard by the fetus can change with the gestational age and developments inside the womb carrying the fetus. The tissues in a mother's abdomen and the fluids can further attenuate and change the characteristics of the sound that reaches the ears of the fetus.

The above-described background description is merely intended to provide a contextual overview regarding fetal monitoring and auditory development of a fetus and is not intended to be exhaustive.

SUMMARY

The following presents a summary to provide a basic understanding of one or more embodiments described herein. This summary is not intended to identify key or critical elements, delineate scope of particular embodiments or scope of claims. Its sole purpose is to present concepts in a simplified form as a prelude to the more detailed description that is presented later. In one or more embodiments described herein, systems, computer-implemented methods, apparatus and/or computer program products to correlate background sounds to FHRs are discussed.

According to an embodiment, a system is provided. The system can comprise a processor that can execute computer-executable instructions stored in memory that, when executed by the processor, facilitate performance of operations comprising employing an ultrasound FMS to detect a plurality of periods of a defined average FHR for a fetus. The operations can further comprise correlating the plurality of periods of the defined average FHR to sounds external to a womb carrying the fetus to identify and record one or more audio patterns that can cause the plurality of periods of the defined average FHR in the fetus. The operations can further comprise replaying the one or more audio patterns to the fetus after applying a first level of modification to the one or more audio patterns based on characteristics of the womb.

According to another embodiment, a computer-implemented method is provided. The computer-implemented method can comprise employing, by a device operatively coupled to a processor, an ultrasound FMS to detect a plurality of periods of a defined average FHR for a fetus. The computer-implemented method can further comprise correlating, by the device, the plurality of periods of the defined average FHR to sounds external to a womb carrying the fetus to identify and record one or more audio patterns that can cause the plurality of periods of the defined average FHR in the fetus. The computer-implemented method can further comprise replaying the one or more audio patterns to a preterm infant corresponding to the fetus after applying a level of modification to the one or more audio patterns based on a microenvironment of the preterm infant, in case of a preterm birth of the fetus.

According to yet another embodiment, a computer program product is provided. The computer program product can comprise a non-transitory computer readable memory having program instructions embodied therewith, the program instructions executable by a processor to cause the processor to employ an ultrasound FMS to detect a plurality of periods of a defined average FHR for a fetus. The program instructions can be further executable by the processor to cause the processor to correlate the plurality of periods of the defined average FHR to sounds external to a womb carrying the fetus to identify and record one or more audio patterns that can cause the plurality of periods of the defined average FHR in the fetus. The program instructions can be further executable by the processor to cause the processor to replay the one or more audio patterns to the fetus after applying a first level of modification to the one or more audio patterns based on characteristics of the womb.

BRIEF DESCRIPTION OF THE DRAWINGS

One or more embodiments are described below in the Detailed Description section with reference to the following drawings.

DETAILED DESCRIPTION

Figure 1:
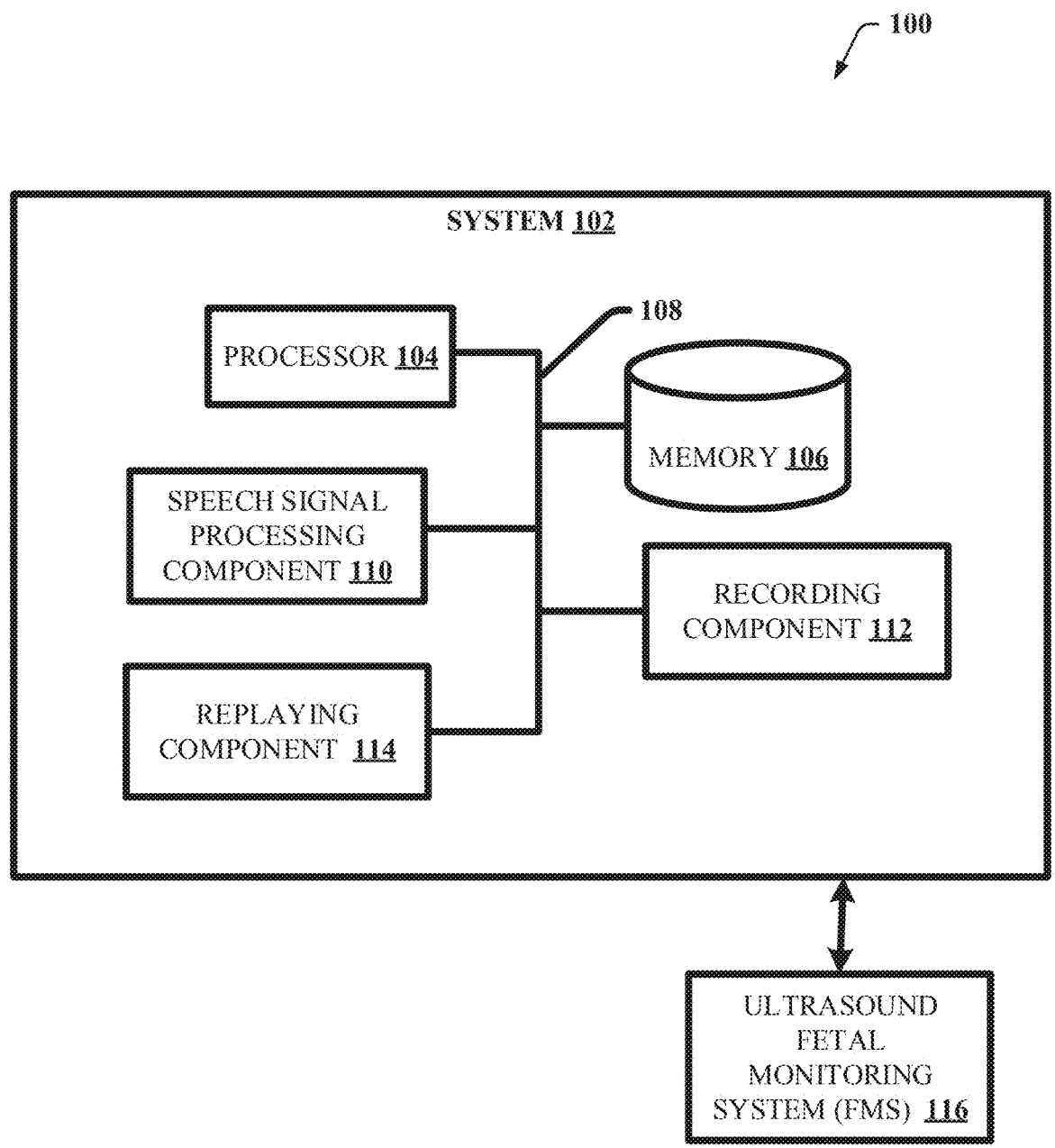
FIG. 1 illustrates a block diagram of an example, non-limiting system that can identify and record sounds that can result in a healthy FHR in a fetus or a preterm infant in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Definitions

Fetus: An unborn offspring that can develop inside the uterus of a human (or another mammal) until birth.
Preterm infant: A preterm infant or a premature infant is an infant born before about 36 weeks of pregnancy.
Gestational age: The age of a pregnancy as measured from the beginning of the pregnant woman's last menstrual period (LMP).

As a fetus grows in the womb, the auditory organs of the fetus also develop, and the characteristics of sounds heard by the fetus can change with the gestational age and developments inside the womb carrying the fetus. The tissues in a mother's abdomen and the fluids can further attenuate and change the characteristics of the sound that reaches the ears of the fetus. A fetus in the womb or an infant outside the womb often shows signs of calming down or reduced distress levels upon hearing soothing voices of the parents or siblings of the fetus. For example, certain sights and sounds can promote an accelerated neurological and physiological growth in a fetus or an infant. Premature infants in a microenvironment can also benefit from the playback of some sounds that the premature infants may have been accustomed to in the womb.

Embodiments described herein include systems, computer-implemented methods, and computer program products that employ pre-recorded sounds/sound patterns based on FHR trends of a fetus to promote neurodevelopmental care in the womb and/or in a microenvironment external to the womb in case of a premature birth. Embodiments described herein can identify specific audible sounds/sound patterns of parents, siblings and/or other caregivers of a fetus that can cause a sense of calmness in the fetus. In various embodiments, this can be achieved by analyzing FHR trends of the fetus when the mother is being monitored via ultrasound transducers, and by correlating periods of slowdown or low variability in the FHR with the audible clues outside the womb. Periods of slowdown can imply that the FHR can be transitioned to an acceptable/normal FHR (e.g., an FHR having a certain standard deviation around a value, an FHR having low variability around a baseline FHR, etc. as measured over time for the fetus), for example, from an abnormally high FHR. For example, based on a knowledge of what typical disturbed FHR values can be for a particular fetus, which knowledge can be acquired via fetal monitoring over time, sounds that can transition a disturbed FHR to a relatively normal FHR for the fetus can be identified as beneficial sounds. Upon identifying specific sounds/sound patterns (e.g., audio levels, frequency, etc.) that can be beneficial to the fetus, the specific sounds or audio clips can be recorded and played back to the fetus to promote a more conducive environment for the fetus and a healthy FHR, when desired. Prior to replaying the recorded audio, some modifications can be applied to the recorded audio based on the gestational age of the fetus, distance between the source of the recorded audio and the fetus, and so on.

In some embodiments, the parents/siblings of the fetus can be informed about the specific auditory stimuli or other stimuli that can most assist the fetus to rest and develop in a healthy manner to aid the development of the fetus. In case of a premature birth of the fetus, the recorded sounds/audio patterns can be replayed in a microenvironment (e.g., an incubator) dedicated to support the premature infant. In various embodiments, the volume and tone of the recorded sounds can be adjusted prior to replaying the recorded sounds to the premature infant based on developments that can occur at different ages. For example, based on an estimate of sound attenuation that the premature infant can be expected to experience as a fetus at different gestational ages in case of a full term, the recorded sounds can be modified prior to replaying the recorded sounds to the premature infant, to provide a womb-like environment to the premature infant. That is because the audio that a fetus can hear can vary at different gestational ages depending on the size of the fetus, volume and contour of the mother's abdomen and other parameters. In various embodiments, an optimum time to transition the premature infant/baby from attenuated to unattenuated sounds can be determined by intermittently observing the heart rate (HR), respiratory rate (RR), etc. of the premature infant in response to unattenuated sounds. Accordingly, the level of modification applied to the recorded sounds prior to replaying the recorded sounds can be gradually adjusted to assist in transitioning the premature infant from prebirth audio patterns (e.g., in the womb) to pure external audio.

Thus, embodiments described herein can employ prebirth FHR monitoring data to select audio patterns that can be conducive to one or more fetuses to promote neurological and physiological growth for the one or more fetuses and/or for corresponding premature infants in case of premature births. The audio patterns can be recorded and replayed to the fetuses or to the premature infants. Prior to replaying the audio patterns, the audio patterns can be modulated based on the gestational ages of the fetuses or the ages of the premature infants. In case of a premature birth, doing so can ensure that the premature infant can be exposed to sounds that the infant would have approximately heard, had the infant continued to develop inside the womb full term. As such, the recorded audio patterns can be adapted to the age of the premature infant, and the recorded audio patterns can be employed during periods when the parents or other caregivers of the premature infant are unable to be near the premature infant.

Embodiments of the present disclosure can be provided via a device (e.g., at medical care facilities such as hospitals, clinics, etc.) that can analyze FHR trends of a fetus when the mother of the fetus is being monitored via ultrasound transducers, by correlating periods of slowdown or low variability in the FHR with sounds (e.g., sounds of the fetus's father or siblings talking, sounds of the mother, music, etc.) external to the womb. For example, the device can monitor the FHR of the fetus and/or additional fetal parameters at different gestational ages by employing data obtained from a medical device such as ultrasound FMS or another suitable device, and employ the information extracted based on the monitoring to correlate the fetal parameters to sounds external to the mother's womb. The device can record the sounds that drive the FHR of the fetus to a desirable value or a desirable variability around a healthy baseline FHR, and the device can store the sounds in a memory accessible to the device. The device can modulate audio patterns associated with the stored sounds based on the gestational age and replay the sounds to the fetus at a future time to generate the desirable FHR in the fetus. In some embodiments, the device can replay the sounds to a preterm infant (e.g., if the fetus is born prematurely). In either embodiment, the device can automatically apply the appropriate level of modulation or modification that may be needed prior to replaying the sounds to the fetus/preterm infant based on the correlation and the age of the fetus/preterm infant. In some embodiments, the device can automatically detect the need to provide the modulated audio patterns, for example, based on continuous monitoring of clinical parameters associated with the fetus or preterm infant. The modulated audio patterns can be provided via a suitable device, such as an infant care station or another device. For example, the modulated audio patterns can be provided to the preterm infant by an infant care station, such as an incubator, an infant warmer, or a device that can operate as an incubator or an infant warmer.

The embodiments depicted in one or more figures described herein are for illustration only, and as such, the architecture of embodiments is not limited to the systems, devices and/or computer-implemented operations depicted therein, nor to any particular order, connection and/or coupling of systems and/or devices depicted therein. For example, in one or more embodiments, the non-limiting systems described herein, such as non-limiting system 100 as illustrated at FIG. 1, and/or systems thereof, further comprise, are associated with and/or are coupled to one or more computer and/or computing-based elements described herein with reference to an operating environment, such as the operating environment 900 illustrated at FIG. 9. For example, in one or more embodiments, non-limiting system 100 is associated with, such as accessible via, a computing environment 900 described below with reference to FIG. 9, such that aspects of processing are distributed between non-limiting system 100 and the computing environment 900. In one or more described embodiments, computer and/or computing-based elements are used in connection with implementing one or more of the systems, devices and/or computer-implemented operations shown and/or described in connection with FIG. 1 and/or with other figures described herein.

FIG. 1 illustrates a block diagram of an example, non-limiting system 100 that can identify and record sounds that can result in a healthy FHR in a fetus or a preterm infant in accordance with one or more embodiments described herein.

Non-limiting system 100 and/or the components of non-limiting system 100 can be employed to use hardware and/or software to solve problems that are highly technical in nature (e.g., related to FMSs, fetal health parameters, correlation of sounds to fetal health parameters, etc.), that are not abstract and that cannot be performed as a set of mental acts by a human. Further, some of the processes performed may be performed by specialized computers for carrying out defined tasks related to correlating sounds to FHRs. Non-limiting system 100 and/or the components of non-limiting system 100 can be employed to solve new problems that arise through advancements in technologies mentioned above and/or the like.

Non-limiting system 100 can comprise system 102. Discussion turns briefly to processor 104, memory 106 and bus 108 of system 102. For example, in one or more embodiments, system 102 can comprise processor 104 (e.g., computer processing unit, microprocessor, classical processor, and/or like processor). In one or more embodiments, a component associated with system 102, as described herein with or without reference to the one or more figures of the one or more embodiments, can comprise one or more computer and/or machine readable, writable and/or executable components and/or instructions that can be executed by processor 104 to enable performance of one or more processes defined by such component(s) and/or instruction(s).

In one or more embodiments, system 102 can comprise a computer-readable memory (e.g., memory 106) that can be operably connected to the processor 104. Memory 106 can store computer-executable instructions that, upon execution by processor 104, can cause processor 104 and/or one or more other components of system 102 (e.g., speech signal processing component 110, recording component 112 and/or replaying component 114) to perform one or more actions. In one or more embodiments, memory 106 can store computer-executable components (e.g., speech signal processing component 110, recording component 112 and/or replaying component 114).

Non-limiting system 100 and/or a component thereof as described herein, can be communicatively, electrically, operatively, optically and/or otherwise coupled to one another via bus 108. Bus 108 can comprise one or more of a memory bus, memory controller, peripheral bus, external bus, local bus, and/or another type of bus that can employ one or more bus architectures. One or more of these examples of bus 108 can be employed. In one or more embodiments, non-limiting system 100 can be coupled (e.g., communicatively, electrically, operatively, optically and/or like function) to one or more external systems (e.g., a non-illustrated electrical output production system, one or more output targets, an output target controller and/or the like), sources and/or devices (e.g., classical computing devices, communication devices and/or like devices), such as via a network. In one or more embodiments, one or more of the components of non-limiting system 100 can reside in the cloud, and/or can reside locally in a local computing environment (e.g., at a specified location(s)).

In addition to the processor 104 and/or memory 106 described above, system 102 can comprise one or more computer and/or machine readable, writable and/or executable components and/or instructions that, when executed by processor 104, can enable performance of one or more operations defined by such component(s) and/or instruction (s) as explained hereinafter. In various embodiments, non-limiting system 100 can employ ultrasound FMS 116 to detect a plurality of periods of a defined average FHR of a fetus, using system 102. The defined average FHR for the fetus can be an FHR that has the optimum variability around a defined baseline FHR for the fetus. In this regard, the defined average FHR can refer to the FHR and the variability of the FHR around the baseline. In various embodiments, speech signal processing component 110 can correlate the plurality of periods of the defined average FHR to sounds external to a womb carrying the fetus to identify one or more audio patterns that can cause the plurality of periods of the defined average FHR in the fetus. Speech signal processing component 110 can be an algorithm that can automatically extract the one or more audio patterns from the sounds. In various embodiments, recording component 112 can record the one or more audio patterns that can cause the plurality of periods of the defined average FHR in the fetus, and replaying component 114 can replay the one or more audio patterns to the fetus after applying a first level of modification to the one or more audio patterns based on characteristics of the womb.

In an embodiment, system 102 can be a single device that can perform the correlation between the plurality of periods of the defined average FHR and the sounds external to the womb, recording of the one or more audio patterns and replaying of the one or more audio patterns. In this regard, system 102 can comprise an embedded microphone or be coupled to an external microphone. In another embodiment, the correlation and the recording can be performed by different devices. In yet another embodiment, system 102 can be incorporated into a larger FMS that can perform the correlation and the recording based on FHR trends accessible to the larger FMS. In some embodiments, in addition to FHR, fetal motion can also be monitored as a trend, to identify the one or more audio patterns that can cause the plurality of periods of the defined average FHR in the fetus.

More specifically, the mother of the fetus can visit a medical facility (e.g., a hospital, a clinic, etc.) for a check-up such as a non-stress test or other type of pregnancy-related check-up. Typically, mothers can visit medical facilities for non-stress tests that involve a minimal amount of monitoring. For complicated birth scenarios due to unwanted tissues or other causes, such monitoring can be activated as early as 22 weeks or 23 weeks of pregnancy, via fetal monitors. During the check-up, embodiments of the present disclosure can be employed to identify, record and replay calming sounds such as the mother's voice, voices of the fetus's father or siblings, music, bells, alarms and/or other sounds that can cause the HR of the fetus to return to or be maintained at the defined average FHR. In various embodiments, the calming sounds can be identified by detecting the plurality of periods of the defined average FHR. For example, during the check-up, ultrasound FMS 116 can be placed on the abdomen of the mother for fetal monitoring, and sounds can be played in the background to correlate the sounds to the FHR. For example, the parents of the fetus, siblings of the fetus or other caregivers related to the fetus can be asked to speak or sing, or music, bells or certain alarms can be played during the fetal monitoring. Ultrasound FMS 116 can detect the FHR by employing doppler ultrasound and generate a corresponding FHR value. The audio signals of the sounds played in the background and the FHR value from ultrasound FMS 116 can be simultaneously accessed by speech signal processing component 110 to identify the one or more audio patterns that can maintain the FHR of the fetus at a defined average value. For example, throughout the fetal monitoring session, speech signal processing component 110 can continuously correlate the FHR values from ultrasound FMS 116 to the audio signals of the sounds to detect a plurality of periods during which the fetus can experience the defined average FHR. The defined average FHR for the fetus can be an FHR that has the optimum variability around a defined baseline FHR for the fetus. Correlating the FHR values to the audio signals can involve identification of time stamp periods of the FHR, which time stamp periods can correspond to optimum variability of the FHR and a defined value of the FHR for the fetus. Multiple such time stamp periods can be observed to identify the particular phrases, tones, voices, etc. that can be conducive to the FHR.

In various embodiments, the FHR of the fetus can be monitored (e.g., via ultrasound FMS 116) when the mother is in a calm state, to identify a healthy FHR (good FHR) for the fetus and when the mother is in a stressed state, to identify an unhealthy FHR (bad or stressed FHR) for the fetus. For example, the FHR of the fetus can be monitored for parameters such as mean, variability, acceleration and deceleration parameters, FHR correlation with fetal movement and other FHR signatures, and the healthy and unhealthy FHRs for the fetus can be identified by system 102 (e.g., by speech signal processing component 110) based on values of the parameters, which values can be indicative of healthy and unhealthy conditions for the fetus. Thereafter, the healthy FHR can be employed as the defined baseline FHR to determine the defined average FHR for the fetus. In various embodiments, periods of calm states or restful states of the fetus can also be employed to define the healthy FHR and the unhealthy FHR for the fetus at different gestational ages. As such, the periods of calm and restful states of the fetus and the corresponding healthy and unhealthy FHRs can vary with gestation as the fetus develops. Typical values for average FHR can be between 110 beats per minute and 160 beats per minute with a variability of around 5 beats per minute to 25 beats per minute. The average HR and the variability can depend on the fetal state, for example, on whether the fetus has a quiet sleep, active sleep or an active awake state. Hence, measurements of healthy versus unhealthy FHRs can be made by comparing the FHR baseline and variability during the same fetal state (e.g., quiet sleep, active sleep or an active awake state). In some embodiments, ultrasound FMS 116 can monitor the FHR and an entity (e.g., hardware, software, AI, neural network, machine) and/or user (mother, nurse or other caregiver)) can mark periods during which the mother is calm and mark periods during which the mother is stressed. The FHR of the fetus can be monitored for parameters such as mean, variability, acceleration and deceleration parameters and other FHR signatures during the calm and stressed periods of the mother. Thereafter, the healthy and unhealthy FHRs for the fetus can be identified by system 102 (e.g., by speech signal processing component 110) based on values of the parameters, which values can be indicative of healthy and unhealthy conditions for the fetus, and the healthy FHR can be employed as the baseline FHR for the fetus to determine the defined average FHR.

In various embodiments, to identify the one or more audio patterns that can cause the defined average FHR in the fetus, speech signal processing component 110 can differentiate between the sounds played in the background during the fetal monitoring of the fetus by correlating the sounds to the healthy FHR and the unhealthy FHR for the fetus. For example, speech signal processing component 110 can identify first sounds (or a first set of audio clips or patterns) that can cause the healthy FHR in the fetus or cause the FHR of the fetus to transition to the healthy FHR and identify second sounds (or a second set of audio clips or patterns) that can cause the unhealthy FHR in the fetus or cause the FHR of the fetus to transition to the unhealthy FHR. In this regard, the healthy and unhealthy FHRs and the defined baseline FHR based on the healthy FHR previously determined for the fetus can be stored in a memory that can be accessible to speech signal processing component 110, and speech signal processing component 110 can access the stored information from the memory to differentiate the sounds played in the background into good sounds/audios (e.g., sounds that can cause a healthy FHR in the fetus) and bad sounds (e.g., sounds that can cause an unhealthy FHR in the fetus). Based on the good sounds/audios, speech signal processing component 110 can extract the one or more audio patterns/sounds that can cause the defined average FHR in the fetus.

In various embodiments, recording component 112 can record the one or more audio patterns/sounds and store the one or more audio patterns/sounds in memory. Thereafter, replaying component 114 can apply a level of modification (e.g., a first level of modification) prior to replaying the recorded audio patterns to the fetus. The recorded audio patterns can be replayed to the fetus when the source of the audio patterns is unavailable to calm the fetus during periods of distress experienced by the fetus. For example, the recorded audio patterns can comprise the voice of the fetus's father, and the portion of the recorded audio comprising the father's voice can be replayed to the fetus in absence of the fetus's father.

In various embodiments, the level of modification can be based on different developmental stages of the fetus inside the womb and on changes in abdominal features corresponding to the womb. For example, as the mother grows in size and as the fetus develops with progression of the gestation, the fetus can be expected to hear varying intensities of sound. That is, the sounds that can be heard by a fetus can vary in characteristics across different gestational stages based on parameters such as the mother's body mass index (BMI), density of tissue around the womb, shape of the mother's womb, amniotic fluid volume, etc. Thus, the level of modification can be different at different gestational ages to ensure that the replayed sounds are perceived by the fetus as having similar characteristics to any other sounds perceived by the fetus at a particular gestational age. Doing so can further ensure that the replayed sounds continue to have a calming effect on the fetus or continue to cause the FHR to transition to the defined average FHR, for example, from an FHR that can be above or below a healthy FHR for the fetus, within a defined time interval. Accordingly, the sounds that can cause the defined average FHR in the fetus can be recorded once, and varying levels of modification can be applied to the sounds prior to replaying the sounds to the fetus at different gestational stages during the pregnancy.

For example, the sounds of a fetus's father that cause the HR of the fetus to transition to a desirable FHR can be recorded at certain instances in time while the father talks to the fetus. The hearing capacity of the fetus and characteristics of the womb carrying the fetus can be specific to the developmental stage of the fetus and the mother at those instances. Thus, to replay the recordings of the father's voice at a later time when the father is absent, the recordings can be modified prior to the replaying to account for changes that may have occurred in the hearing capacity of the fetus and the characteristics of the womb since the first recording. In such a scenario, the efficacy of the level of modification to be applied to the recordings of the father's voice can checked and the level of modification can be applied or adjusted accordingly, if the replayed sounds do not produce or drive the FHR of the fetus to a desirable value. In various embodiments, a machine learning-based learning process can be employed to adjust the level of modification such that replaying component 114 can access the FHR of the fetus after replaying the recordings of the father's voice to the fetus with or without applying any modification to the recordings, and if the FHR is not a desirable FHR, replaying component 114 can employ the FHR of the fetus as feedback to apply a level of modification or adjust an existing level of modification applied to the recordings prior to replaying the recorded sounds to the fetus, until the desirable FHR is achieved.

In some embodiments, the level of modification can involve attenuating the recorded sounds or muffling the sounds. For example, based on a location of where the sounds were recorded, the recorded sounds can be muffled prior to replaying the recorded sounds for the fetus. For example, the recorded sounds can include sounds played at a certain distance from the mother's abdomen, and the sounds can be slightly muffled prior to replaying the sounds closer to the fetus after recording the sounds, to ensure that the sounds can have the same effect on the FHR as that of the original sounds (e.g., sounds uttered by the parents, siblings or caregivers of the fetus, music, bells, alarms, etc.) to transition or maintain the FHR at the defined average FHR. In other embodiments, the level of modification can involve modifying different parameters of the recorded sounds such as frequency, etc. depending on the hearing sensory organs of the fetus at a particular developmental stage, amount of fluid surrounding the fetus, etc. In various embodiments, the recorded sounds can be replayed until the fetus is ready to be delivered. In various embodiments, replaying the recorded sounds can augment neurological and physiological development of the fetus by maintaining a healthy FHR. Further, replaying the recorded sounds can maintain a healthy physiological state of the fetus. In various embodiments, the replaying of the recorded sounds can occur at the medical facility (e.g., hospital, clinic, etc.) when the mother visits the medical facility for the check-up.

In at least some embodiments, such as in case of a complicated pregnancy where the fetus can be at a risk of being born prematurely, recording component 112 can record the one or more audio patterns/sounds (e.g., calming sounds) in preparation for a preterm birth of the fetus. In such embodiments, replaying component 114 can replay the one or more audio patterns/sounds to a preterm/premature infant corresponding to the fetus after applying a level of modification (e.g., a second level of modification) to the one or more audio patterns/sounds based on a microenvironment of the preterm infant, in case of a preterm birth of the fetus. This can make the microenvironment more womb-like for the preterm infant. A preterm infant can be an infant born before about 36 weeks of pregnancy. The microenvironment can be an incubator or an environment similar to an incubator that can sustain the preterm infant by providing the appropriate temperature, humidity and oxygen levels to the preterm infant until the preterm infant is developed enough to not need the microenvironment. In various embodiments, the level of modification can be based on an estimate of pre-birth audio patterns that the preterm infant can be expected to hear as the fetus at different developmental stages inside the womb, and the pre-birth audio patterns can be estimated by analyzing abdominal features (e.g., contour size, tissue type, etc. of the abdominal area) of the mother before the preterm birth of the fetus. In various embodiments, the level of modification can be determined by employing a tissue mimicking phantom.

A tissue mimicking phantom can mimic different tissues and measure an audio signal corresponding to a broad spectrum sound for different physiological parameters of a mother carrying the fetus. For example, a three-dimensional (3D) tissue mimicking model can be developed based on the shape and size of the contours of the mother's abdomen at a gestational age. Microphones can be embedded inside the 3D model, and a speaker can be positioned outside the model. The speaker can play a broad spectrum sound (e.g., white noise) and the audio response (signal) transmitted inside the tissue mimicking phantom can be measured via the microphones for different BMI values, varying amounts of amniotic fluids, gestational ages, etc. Thus, as the fetus grows in size over time, a tissue mimicking phantom can be employed to model the bodily changes of the mother and identify characteristics of sound that the fetus can be expected to hear. The tissue mimicking phantom can be employed based on certain assumptions about the auditory functions of the fetus at different gestational ages. In some embodiments the tissue mimicking phantom can be a balloon filled with water or other liquids and having a microphone at the center, and the broad spectrum sound can be played on the outside of the balloon. An entity (e.g., hardware, software, AI, neural network, machine and/or user) or a component of system 102 can make observations based on audio signals detected by the microphone at the center of the balloon for different sizes of the balloon with different liquids inside the balloon. Tissue mimicking phantoms of different sizes corresponding to different gestational ages during a pregnancy can be employed, and attenuation factors can be determined accordingly.

As described supra, a feedback mechanism can be employed where replaying component 114 can replay the recorded sounds to the fetus or to the preterm infant (in case of a preterm birth) during ongoing monitoring of the fetus or the preterm infant to validate that recording component 112 has recorded the correct sounds, that is, to validate that the sounds identified by speech signal processing component 110 as being helpful in transitioning the HR of the fetus or the preterm infant to a defined average value are correctly identified and recorded. In various embodiments, the feedback mechanism can be implemented during fetal monitoring of the fetus by ultrasound FMS 116, immediately after recording the sounds.

In various embodiments, an optimum time to transition the one or more audio patterns from attenuated sound to unattenuated sound can be determined by intermittently observing (e.g., by a hardware, software, AI, neural network, machine and/or user) responses of the preterm infant to the unattenuated sound, to assist the preterm infant in transitioning from hearing pre-birth audio patterns to hearing post-birth audio patterns. For example, replaying component 114 can replay the recorded sounds with decreasing levels of modification applied to the recorded sounds to assist the preterm infant in transitioning to the unattenuated sound. The transitioning can be performed as part of weaning the preterm infant out of the microenvironment while gradually removing the support of the microenvironment. The transitioning can depend on developmental progress of the preterm infant. In some cases, the transitioning can be performed in the range of 32-36 weeks from conception. In various embodiments, the RR and the RR variability of the preterm infant, the HR and HR variability of the preterm infant and/or other parameters can be monitored in response to sounds external to the womb to determine whether the preterm infant can be transitioned from hearing attenuated sounds to unattenuated sounds (e.g., the unmodified sounds of the parents, music, other sounds, etc.). The RR can be defined as the number of times the preterm infant breathes in one second(s), which can indicate the health of the preterm infant.

In various embodiments, non-limiting system 100 can comprise one or more additional ultrasounds FMSs (not illustrated). Non-limiting system 100 can employ the one or more additional ultrasound FMSs to detect respective sets of periods of defined average FHRs for one or more additional fetuses in the womb to correlate the respective periods of defined average FHRs to the sounds external to the womb and to identify and record respective audio patterns that can cause the respective sets of periods of defined average FHRs in the one or more additional fetuses. For example, the mother can be pregnant with twin fetuses and a second ultrasound FMS can be employed, in addition to ultrasounds FMS 116, to monitor an FHR for the second fetus. In various embodiments, speech signal processing component 110 can monitor the FHR of the second fetus to identify a defined average FHR for the second fetus. The defined average FHR for the second fetus can be an FHR that has an optimum variability around a defined baseline FHR for the second fetus. In some embodiments, ultrasound FMS 116 and another ultrasound FMS can monitor respective FHRs of the first fetus and the second fetus simultaneously. The respective FHRs of the first fetus and the second fetus can transition to respective defined average values at different times during the simultaneous fetal monitoring, based on which, audio patterns that can cause the respective defined FHRs in the first fetus and the second fetus can be identified by speech signal processing component 110.

Speech signal processing component 110 can employ the same techniques to identify the defined average FHR for the second fetus as those employed to identify the defined average FHR for the first fetus. For example, speech signal processing component 110 can monitor the FHR of the second fetus when the mother is in a calm state, to identify a healthy FHR (good FHR) for the second fetus and when the mother is in a stressed state, to identify an unhealthy FHR (bad or stressed FHR) for the second fetus. In some embodiments, ultrasound FMS 116 can monitor the FHR for the second fetus and an entity (e.g., hardware, software, AI, neural network, machine and/or user (mother, nurse or other caregiver)) can mark periods during which the mother is calm and mark periods during which the mother is stressed. Thereafter, the healthy FHR for the second fetus can be employed as the defined baseline FHR for the second fetus to determine the defined average FHR for the second fetus.

As before, speech signal processing component 110 can differentiate the sounds played in the background during the fetal monitoring of the second fetus, by correlating the sounds to the healthy FHR and the unhealthy FHR for the second fetus, to identify one or more audio patterns that can cause the defined average FHR in the second fetus. In various embodiments, sounds that can cause healthy FHRs in both fetuses can be classified (e.g., by speech signal processing component 110) as desirable/good sounds, sounds that can cause unhealthy or stressed FHRs in both fetuses can be classified (e.g., by speech signal processing component 110) as undesirable/bad sounds, sounds that can cause a healthy FHR in one fetus and no response or a neutral response in another fetus can be classified (e.g., by speech signal processing component 110) as moderately desirable/good sounds, and sounds that cause an unhealthy FHR in one fetus and no response or a neutral response in another fetus can be classified (e.g., by speech signal processing component 110) as undesirable sounds. Thus, speech signal processing component 110 can be trained to identify defined average FHRs for respective fetuses of a single mother and to simultaneously perform correlations between background sounds and the defined average FHRs for the respective fetuses to identify audio patterns/sounds that can cause the defined average FHRs in the respective fetuses.

In various embodiments, the audio patterns/sounds can be recorded by recording component 112. In various embodiments, replaying component 114 can replay the recorded audio patterns to the respective fetuses after modifying the recorded audio patterns based on the characteristics of the womb. In at least some embodiments, replaying component 114 can replay the recorded audio patterns to respective preterm infants in case of preterm births of the respective fetuses after modifying the respective audio patterns based on respective microenvironments of respective preterm infants. In each case, the level of modification to be applied to the recorded audio patterns can be determined by employing a tissue mimicking phantom or by estimating pre-birth audio patterns that the preterm infants can be expected to hear as the respective fetuses at different developmental stages inside the womb, wherein the pre-birth audio patterns can be estimated by analyzing abdominal features corresponding to the womb, as explained supra.

Figure 2:
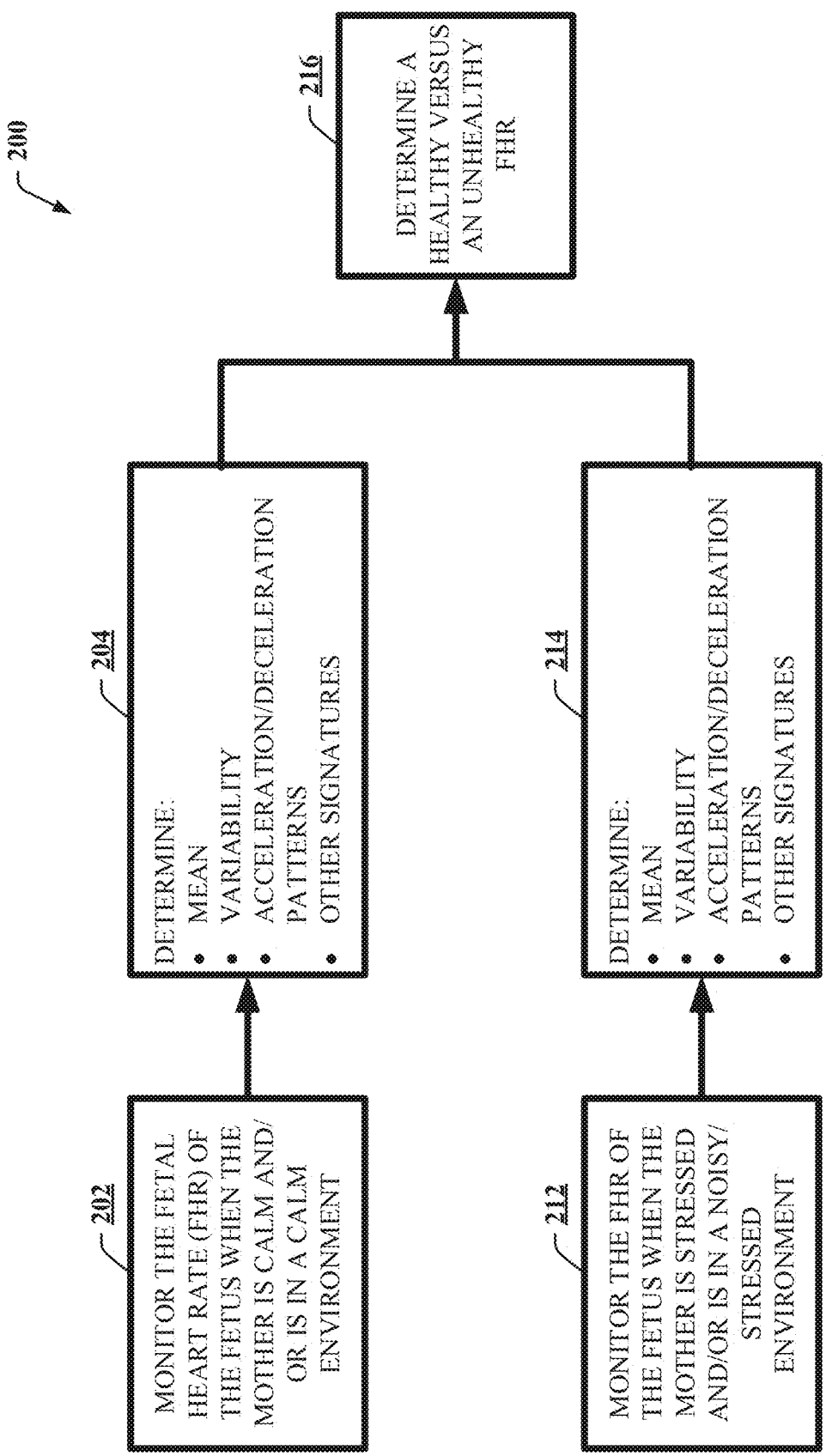
FIG. 2 illustrates a flow diagram of an example, non-limiting method that can be employed to identify healthy and unhealthy FHRs in a fetus in accordance with one or more embodiments described herein.

FIG. 2 illustrates a flow diagram of an example, non-limiting method 200 that can be employed to identify healthy and unhealthy FHRs in a fetus in accordance with one or more embodiments described herein. One or more operations described with reference to FIG. 2 can be performed by one or more components of non-limiting system 100. Repetitive description of like elements and/or processes employed in respective embodiments is omitted for sake of brevity.

Embodiments of the present disclosure can be employed to identify, record and replay calming sounds such as the voice of a mother of a fetus, voices of the fetus's father or siblings, music and/or other sounds that can cause the HR of the fetus to return to or be maintained at the defined average FHR for the fetus. In various embodiments, the calming sounds can be identified by detecting the plurality of periods of the defined average FHR. For example, ultrasound FMS 116 can be placed on the abdomen of the mother for fetal monitoring, and sounds can be played in the background to correlate the sounds to the FHR. For example, the parents of the fetus, siblings of the fetus or other caregivers related to the fetus can be asked to speak or sing, or music can be played during the fetal monitoring. Ultrasound FMS 116 can employ doppler ultrasound to detect the FHR based on ultrasound waves reflected by the fetus and generate a corresponding FHR value. The audio signals of the sounds played in the background and the FHR values from ultrasound FMS 116 can be simultaneously accessed by speech signal processing component 110 to identify the one or more audio patterns that can maintain the FHR of the fetus at a defined average value. For example, throughout the fetal monitoring session, speech signal processing component 110 can correlate the FHR values from ultrasound FMS 116 to the audio signals of the sounds to detect a plurality of periods during which HR of the fetus can be at the defined average FHR. The defined average FHR for the fetus can be an FHR that has a low variability around a defined baseline FHR for the fetus.

With continued reference to FIG. 1, non-limiting method 200 illustrates a method to identify the defined average FHR for a fetus. For example, at 202, the FHR can be monitored (e.g., via ultrasound FMS 116) when the mother is in a calm state and/or in a calm environment, to identify a healthy FHR (good FHR) for the fetus, and at 212 the FHR can be monitored (e.g., via ultrasound FMS 116) when the mother is in a stressed state, to identify an unhealthy FHR (bad or stressed FHR) for the fetus. At 204, parameters such as mean, variability, acceleration and deceleration parameters and/or other FHR signatures can be monitored for the fetus when the mother is in a calm state and/or calm environment, and at 214, the same parameters can be monitored for the fetus when the mother is in a stressed state. In various embodiments, periods of calm states or restful states of the fetus can also be employed to define the healthy FHR and the unhealthy FHR for the fetus at different gestational ages. As such, the periods of calm and restful states of the fetus and the corresponding healthy and unhealthy FHRs can vary with gestation as the fetus develops. At 216, the healthy and unhealthy FHRs for the fetus can be identified by system 102 (e.g., by speech signal processing component 110) based on values of the parameters determined at 204 and 214, which values can be indicative of healthy and unhealthy conditions for the fetus. For example, the values of the parameters (e.g., mean, variability, acceleration and deceleration parameters and/or other FHR signatures) determined at 204 can be indicative of a healthy FHR of the fetus, and the values of the parameters (e.g., mean, variability, acceleration and deceleration parameters and/or other FHR signatures) determined at 214 can be indicative of an unhealthy FHR of the fetus. Thereafter, the healthy FHR values can be employed as the defined baseline FHR for the fetus to determine the defined average FHR for the fetus. In some embodiments, non-limiting method 300 can be employed as another method to determine the defined average FHR.

Figure 3:
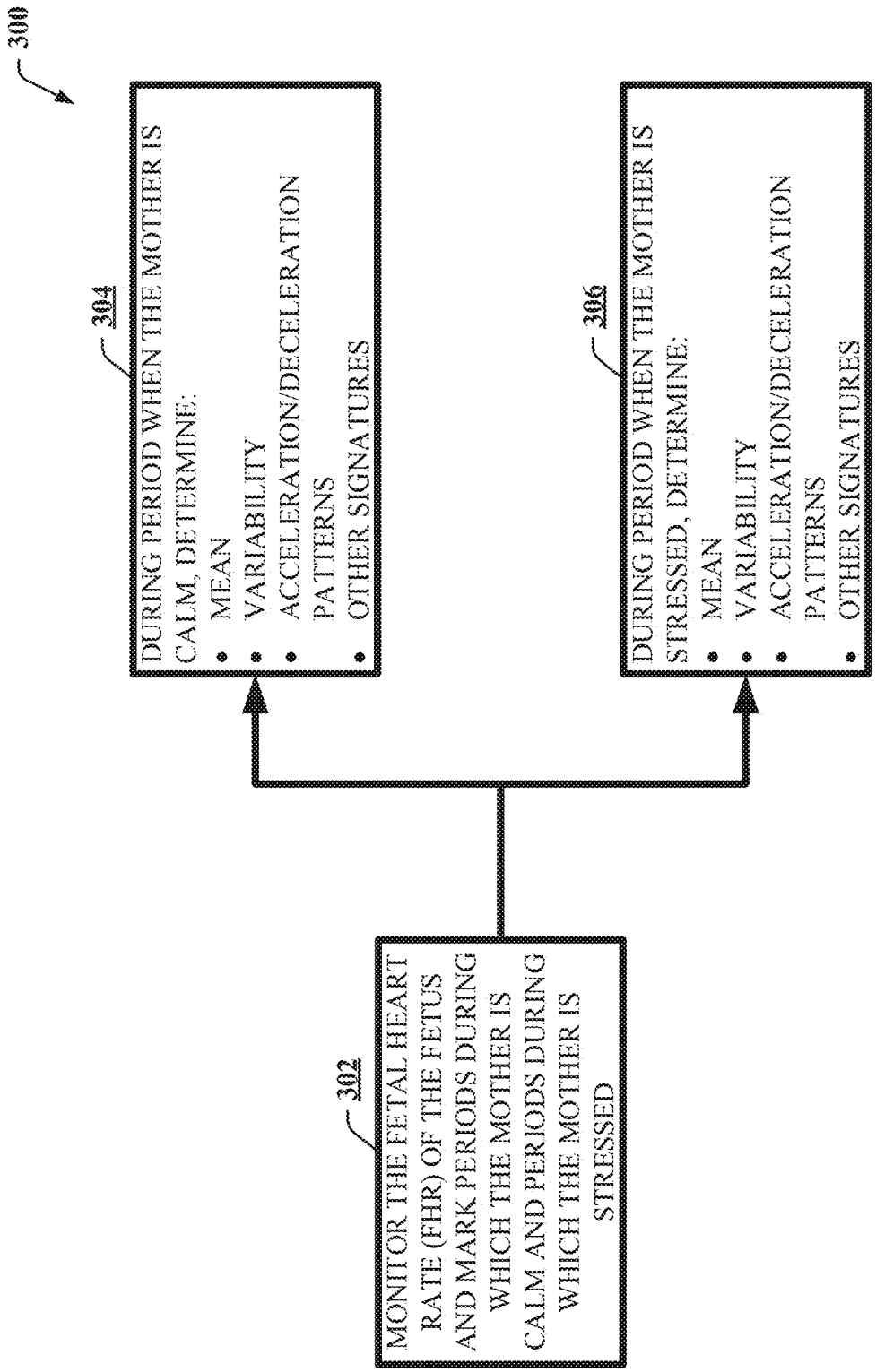
FIG. 3 illustrates a flow diagram of another example, non-limiting method that can be employed to identify healthy and unhealthy FHRs in a fetus in accordance with one or more embodiments described herein.

FIG. 3 illustrates a flow diagram of an example, non-limiting method 300 that can be employed to identify healthy and unhealthy FHRs in a fetus in accordance with one or more embodiments described herein. One or more operations described with reference to FIG. 3 can be performed by one or more components of non-limiting system 100. Repetitive description of like elements and/or processes employed in respective embodiments is omitted for sake of brevity.

In some embodiments, non-limiting method 300 can be employed to determine the defined average FHR for the fetus. For example, at 302, ultrasound FMS 116 can monitor the FHR of the fetus and an entity (e.g., hardware, software, AI, neural network, machine and/or user (mother, nurse or other caregiver)) can mark periods during which the mother is calm and mark periods during which the mother is stressed. At 304, values of parameters such as mean, variability, acceleration and deceleration parameters and/or other FHR signatures can be determined for the fetus during periods when the mother is calm. Similarly, at 306, values of parameters such as mean, variability, acceleration and deceleration parameters and/or other FHR signatures can be determined for the fetus during periods when the mother is stressed. Thereafter, the healthy and unhealthy FHRs for the fetus can be identified by system 102 (e.g., by speech signal processing component 110) based on values of the parameters (e.g., mean, variability, acceleration and deceleration parameters and/or other FHR signatures), which values can be indicative of healthy and unhealthy conditions for the fetus, and the healthy FHR can be employed as the baseline FHR for the fetus to determine the defined average FHR.

In some embodiments, speech signal processing component 110 can be trained to determine respective defined average FHRs for respective fetuses of a mother. For example, in an embodiment, the mother can be pregnant with twin fetuses and a second ultrasound FMS can be employed in addition to ultrasound FMS 116 to monitor an FHR of the second fetus. In various embodiments, speech signal processing component 110 can also monitor the FHR of the second fetus to identify a defined average FHR for the second fetus. The defined average FHR for the second fetus can be an FHR that has an optimum variability around a defined baseline FHR for the second fetus. In some embodiments, ultrasound FMS 116 and another ultrasound FMS can simultaneously monitor respective FHRs of the first fetus and the second fetus. Speech signal processing component 110 can employ the techniques of non-limiting method 200 or non-limiting method 300 to identify the defined average FHR for the first fetus and the second fetus. Thereafter, the healthy FHRs for each fetus can be employed as the defined baseline FHRs for each fetus to determine the defined average FHR for the second fetus.

Figure 4:
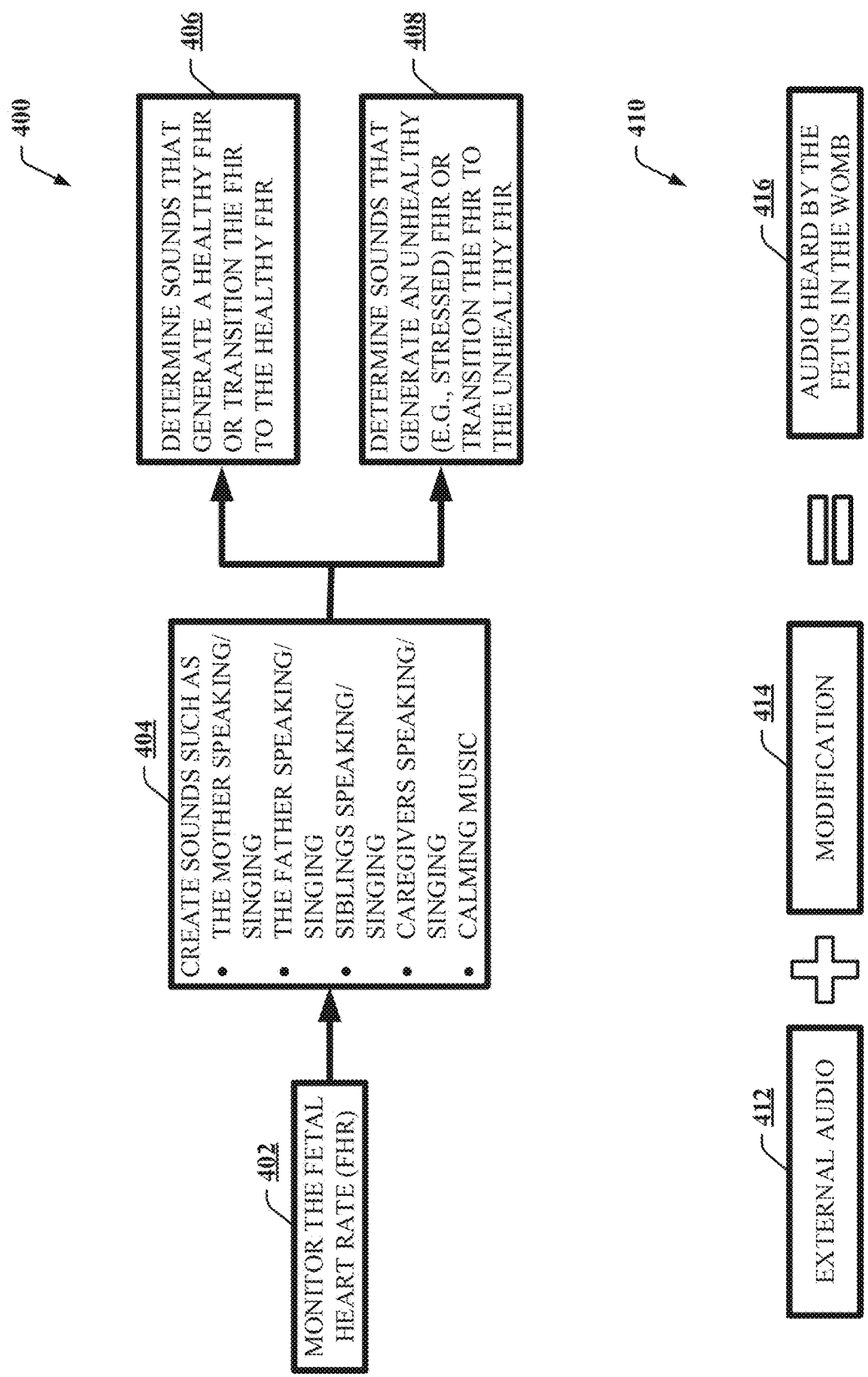
FIG. 4 illustrates a flow diagram of example, non-limiting method that can be employed to identify audios that can be beneficial for the FHR of a fetus in accordance with one or more embodiments described herein.

FIG. 4 illustrates a flow diagram of example, non-limiting method 400 that can be employed to identify audios that can be beneficial for the FHR of a fetus in accordance with one or more embodiments described herein. One or more operations described with reference to FIG. 4 can be performed by one or more components of non-limiting system 100. Repetitive description of like elements and/or processes employed in respective embodiments is omitted for sake of brevity.

Embodiments of the present disclosure can be employed to identify, record and replay calming sounds such as the voice of a mother of a fetus, voices of the fetus's father or siblings, music and/or other sounds that can cause the HR of the fetus to return to or be maintained at the defined average FHR for the fetus. In various embodiments, the calming sounds can be identified by detecting the plurality of periods of the defined average FHR. For example, ultrasound FMS 116 can be placed on the abdomen of the mother for fetal monitoring, and sounds can be played in the background to correlate the sounds to the FHR. For example, the parents of the fetus, siblings of the fetus or other caregivers related to the fetus can be asked to speak or sing, or music, bells or alarms can be played during the fetal monitoring. Ultrasound FMS 116 can detect the FHR by detecting ultrasound waves reflected by the fetus and generate an FHR value. The audio signals of the sounds played in the background and the FHR values from ultrasound FMS 116 can be simultaneously accessed by speech signal processing component 110 to identify the one or more audio patterns that can maintain the FHR of the fetus at a defined average value (i.e., maintain the defined average FHR for the fetus). For example, throughout the fetal monitoring session, speech signal processing component 110 can correlate the FHR values from ultrasound FMS 116 to the audio signals of the sounds to detect a plurality of periods during which HR of the fetus can be at the defined average FHR. The defined average FHR for the fetus can be an FHR that has a low variability around a defined baseline FHR for the fetus.

With continued reference to the embodiments of FIGS. 1-3, non-limiting method 400 illustrates how speech signal processing component 110 can differentiate the sounds played in the background during the fetal monitoring of the fetus by correlating the sounds to the healthy FHR and the unhealthy FHR for the fetus (previously determined), to identify the one or more audio patterns that can cause the defined average FHR in the fetus. For example, speech signal processing component 110 can identify first sounds that can cause the healthy FHR in the fetus or cause the FHR of the fetus to transition to the healthy FHR. Speech signal processing component 110 can further identify second sounds that can cause the unhealthy FHR in the fetus or cause the FHR of the fetus to transition to the unhealthy FHR. For example, at 402, ultrasound FMS 116 can be placed on the mother's abdomen. At 404, different sounds can be played in the background. For example, the mother, the father and/or siblings of the fetus can be asked to talk or sing to the fetus, calming music can be played near the mother, etc. At 406, speech signal processing component 110 can detect sounds that can cause a healthy FHR in the fetus or cause the FHR of the fetus to transition to the healthy FHR, for example, from an abnormal FHR. Likewise, at 408, speech signal processing component 110 can detect sounds that can cause an unhealthy/stressed FHR in the fetus or cause the FHR of the fetus to transition to the unhealthy/stressed FHR, for example, from normal FHR. In this regard, the healthy and unhealthy FHRs and the defined baseline FHR based on the healthy FHR for the fetus can be stored in a memory that can be accessible to speech signal processing component 110. Speech signal processing component 110 can access the stored information from the memory to differentiate the sounds played in the background into good sounds/audios (e.g., sounds that can cause a healthy FHR in the fetus) and bad sounds (e.g., sounds that can cause an unhealthy FHR in the fetus). Speech signal processing component 110 can extract, based on the good sounds/audios, the one or more audio patterns/sounds that can cause the defined average FHR in the fetus.

In various embodiments, the one or more audio patterns/sounds can be recorded by recording component 112 and replayed by replaying component 114 after applying a level of modification to the recorded one or more audio patterns/sounds. For example, as illustrated at 410, external audio at 412 combined with sound modification at 414 can be the audio replayed to the fetus at 416.

In some embodiments, speech signal processing component 110 can be trained to determine respective defined average FHRs for respective fetuses of a mother and to simultaneously perform correlations between background sounds and respective FHRs for the respective fetuses to detect respective audio patterns/sounds that can cause the respective defined average FHRs in the respective fetuses. In such embodiments, speech signal processing component 110 can classify sounds that can cause healthy FHRs in both fetuses as desirable/good sounds, sounds that can cause unhealthy or stressed FHRs in both fetuses as undesirable/bad sounds, sounds that can cause a healthy FHR in one fetus and no response or a neutral response in another fetus as moderately desirable/good sounds, and sounds that cause an unhealthy FHR in one fetus and no response or a neutral response in another fetus as undesirable sounds. For example, ultrasound FMS 116 and another ultrasound FMS can be placed on the mother's abdomen for 1 hour to monitor the respective fetuses during which time some sounds can be played in the background. During the first 20 minutes, the first fetus can be very restful, and the second fetus can be agitated, during the next 20 minutes, both fetuses can be restful, and so on. Thus, in case of certain sounds being good for one fetus and not for another fetus, speech signal processing component 110 can be trained to identify common sounds that can be good for both fetuses.

Figure 5:
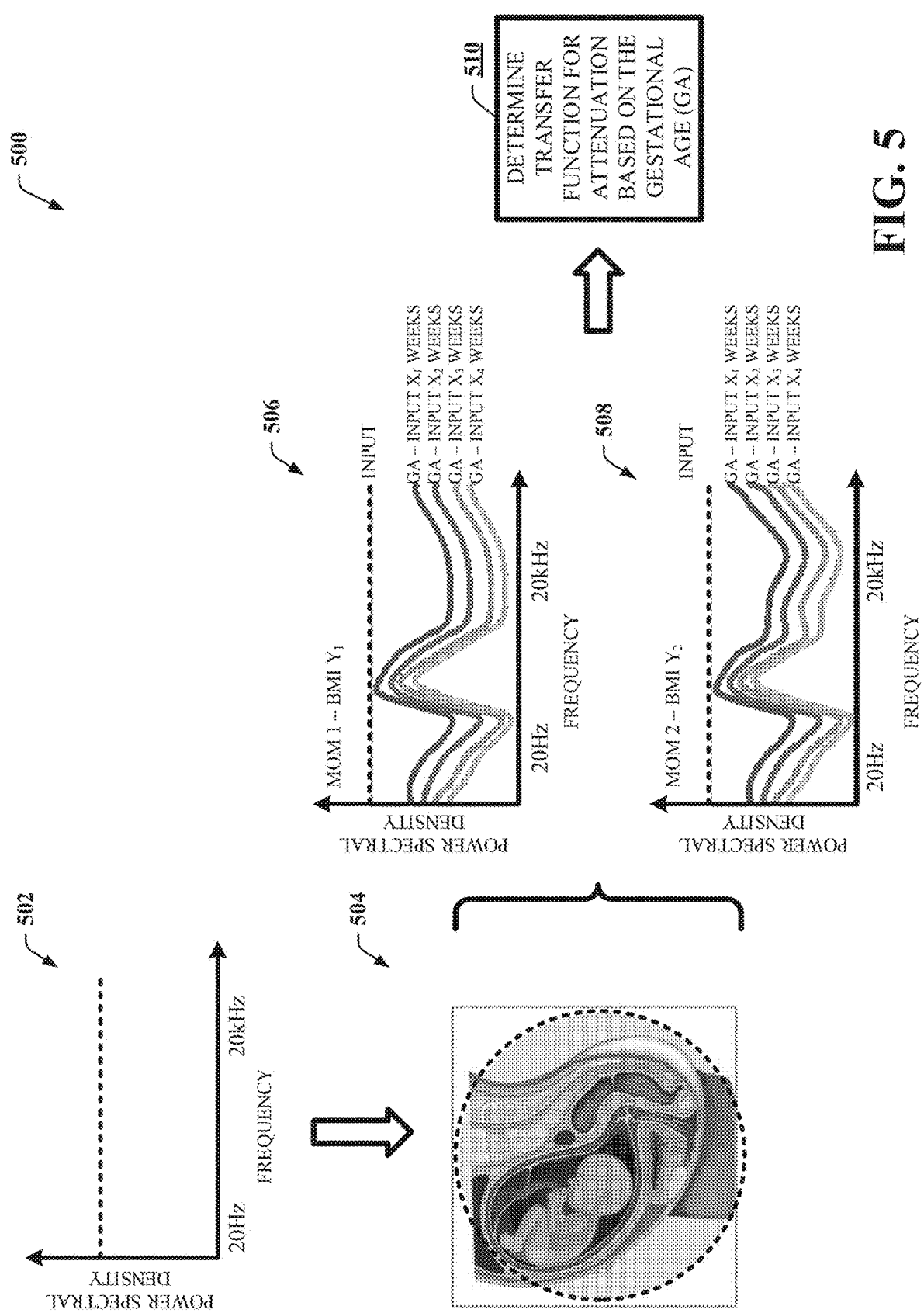
FIG. 5 illustrates a flow diagram of example, non-limiting method that can be employed to attenuate audios prior to replaying the audios to a preterm infant in accordance with one or more embodiments described herein.

FIG. 5 illustrates a flow diagram of example, non-limiting method 500 that can be employed to attenuate audios prior to replaying the audios to a preterm infant in accordance with one or more embodiments described herein. One or more operations described with reference to FIG. 5 can be performed by one or more components of non-limiting system 100. Repetitive description of like elements and/or processes employed in respective embodiments is omitted for sake of brevity.

Continuing from the embodiments described with reference to FIG. 4, recording component 112 can record one or more audio patterns/sounds that can cause a defined average FHR in a fetus, and the one or more audio patterns/sounds can be stored in memory. Thereafter, replaying component 114 can apply a level of modification prior to replaying the recorded audio patterns to the fetus. As described elsewhere herein, such embodiments can be applicable in scenarios where pre-recorded sounds known to generate or transition an FHR to a desirable value need to be replayed in absence of the source (e.g., father, siblings, etc.) of the pre-recorded sounds, if the replayed sounds do not generate a desirable FHR. Accordingly, the level of modification can be based on different developmental stages of the fetus inside the womb and on changes in abdominal features corresponding to the womb. For example, the sounds that can be heard by a fetus can vary in characteristics across different gestational stages based on parameters such as the mother's BMI, tissue density around the womb, shape of the mother's womb, amniotic fluid volume, etc.

In some embodiments, the recorded audio patterns can be replayed to a corresponding preterm infant in case of a premature birth of the fetus, and replaying component 114 can apply a different level of modification prior to replaying the recorded audio patterns to the preterm infant. For example, replaying component 114 can replay the recorded audio patterns to a preterm/premature infant corresponding to the fetus after applying a level of modification to the one or more audio patterns/sounds based on a microenvironment of the preterm infant, in case of a preterm birth of the fetus. This can make the microenvironment more womb-like for the preterm infant. A preterm infant can be an infant born before about 36 weeks of pregnancy. The microenvironment can be an incubator or an environment similar to an incubator that can sustain the preterm infant by providing the appropriate temperature, humidity and oxygen levels to the preterm infant until the preterm infant is developed enough to not need the microenvironment. In various embodiments, the level of modification can be based on an estimate of pre-birth audio patterns that the preterm infant can be expected to hear as the fetus at different developmental stages inside the womb, and the pre-birth audio patterns can be estimated by analyzing abdominal features (e.g., contour size, tissue type, etc. of the abdominal area) of the mother before the preterm birth of the fetus. In various embodiments, the level of modification can be determined by employing a tissue mimicking phantom.

A tissue mimicking phantom can mimic different tissues and measure an audio signal corresponding to a broad spectrum sound for different physiological parameters of a mother carrying the fetus. For example, a 3D tissue mimicking model can be developed based on the shape and size of the contours of the mother's abdomen at different gestational stages. Microphones can be embedded inside the 3D model, and a speaker can be positioned outside the model. At 502, the speaker can play a broad spectrum sound (e.g., white noise). In non-limiting method 500, the broad spectrum sound is described as a dotted line on a graph of power spectral density versus frequency at 502. At 504, the audio response (signal) transmitted inside the tissue mimicking phantom can be measured via the microphones for different BMI values, varying amounts of amniotic fluids, etc. based on different gestational ages. In non-limiting method 500, the circle in the dashed line at 504 can illustrate the portion of the mother's anatomy that the tissue mimicking phantom can be based upon.

Non-limiting method 500 further illustrates graph 506 and graph 508 of power spectral density versus frequency of sound detected by the microphones inside the tissue mimicking phantom for two different mothers. In either graph, the dotted horizontal line represents the broad spectrum sound projected at the tissue mimicking phantom. Each of graphs 506 and 508 illustrate four additional plot lines corresponding to the power spectral density (PSD) of the sounds detected by the microphones of the tissue mimicking phantom at different gestational ages. At 510, such additional plot lines can be evaluated to determine the level of modification to be applied to sounds recorded by recording component 112 by determining a transfer function for modification of the recorded sounds. In various embodiments, the transfer function for the recorded sounds can be the PSD at a specific gestational age (GA). That is, the PSD of the sounds detected by the microphone inside the tissue mimicking phantom can be directly applied as the transfer function. For example, in the case of a preterm birth at 28 weeks, the PSD corresponding to the GA at 28 weeks can be employed as the transfer function (e.g., by replaying component 114). In some examples, other parameters, such as BMI, can also be matched. In case data for the specific GA is not available, interpolation from the available PSDs can be employed to determine the transfer function (e.g., by replaying component 114).

Thus, a tissue mimicking phantom can be employed to model the bodily changes of the mother and identify characteristics of sound that the fetus can be expected to hear to determine the appropriate levels of modification to be applied to the recorded audio patterns for different developmental stages of the preterm infant. In some embodiments the tissue mimicking phantom can be a balloon filled with water or other liquids and having a microphone at the center, and the broad spectrum sound can be played on the outside of the balloon. An entity (e.g., hardware, software, AI, neural network, machine and/or user) can make observations based on audio signals detected by the microphone at the center of the balloon for different sizes of the balloon with different liquids inside the balloon.

As stated elsewhere herein, in case of a complicated pregnancy where the fetus can be at a risk of being born prematurely, recording component 112 can record the one or more audio patterns/sounds (e.g., calming sounds) in preparation for a preterm birth of the fetus. In case of a preterm birth of a fetus, replaying component 114 can replay the one or more audio patterns/sounds to the preterm/premature infant corresponding to the fetus, after applying a level of modification to the one or more audio patterns/sounds, based on a microenvironment of the preterm infant. In various embodiments, the level of modification can be based on an estimate of pre-birth audio patterns that the preterm infant can be expected to hear as the fetus at different developmental stages inside the womb, and the pre-birth audio patterns can be estimated by analyzing abdominal features (e.g., contour size, tissue type, etc. of the abdominal area) of the mother before the preterm birth of the fetus. In various embodiments, the level of modification can be determined by employing a tissue mimicking phantom.

Thus, in case of a preterm birth, various embodiments herein can project soothing sounds that the preterm infant would have been expected to hear if the preterm infant was not born prematurely and had continued to develop normally inside the fetus. The tissue mimicking phantom can account for the abdominal features (e.g., body mass, adipose tissue, etc.) of the mother during pregnancy, and information (such as from graphs 506 and 508) generated based on the tissue mimicking phantom can be extrapolated based on the age of the preterm infant, for example, for progression from the 25th week to the 26th week of the preterm infant. Accordingly, the level of modification can be applied to sounds identified as being beneficial to the HR of the preterm infant prior to replaying the sounds to the preterm infant, as further described by non-limiting method 600. In various embodiments, the level of modification can be gradually decreased to transition the preterm infant to unattenuated sounds.

Figure 6:
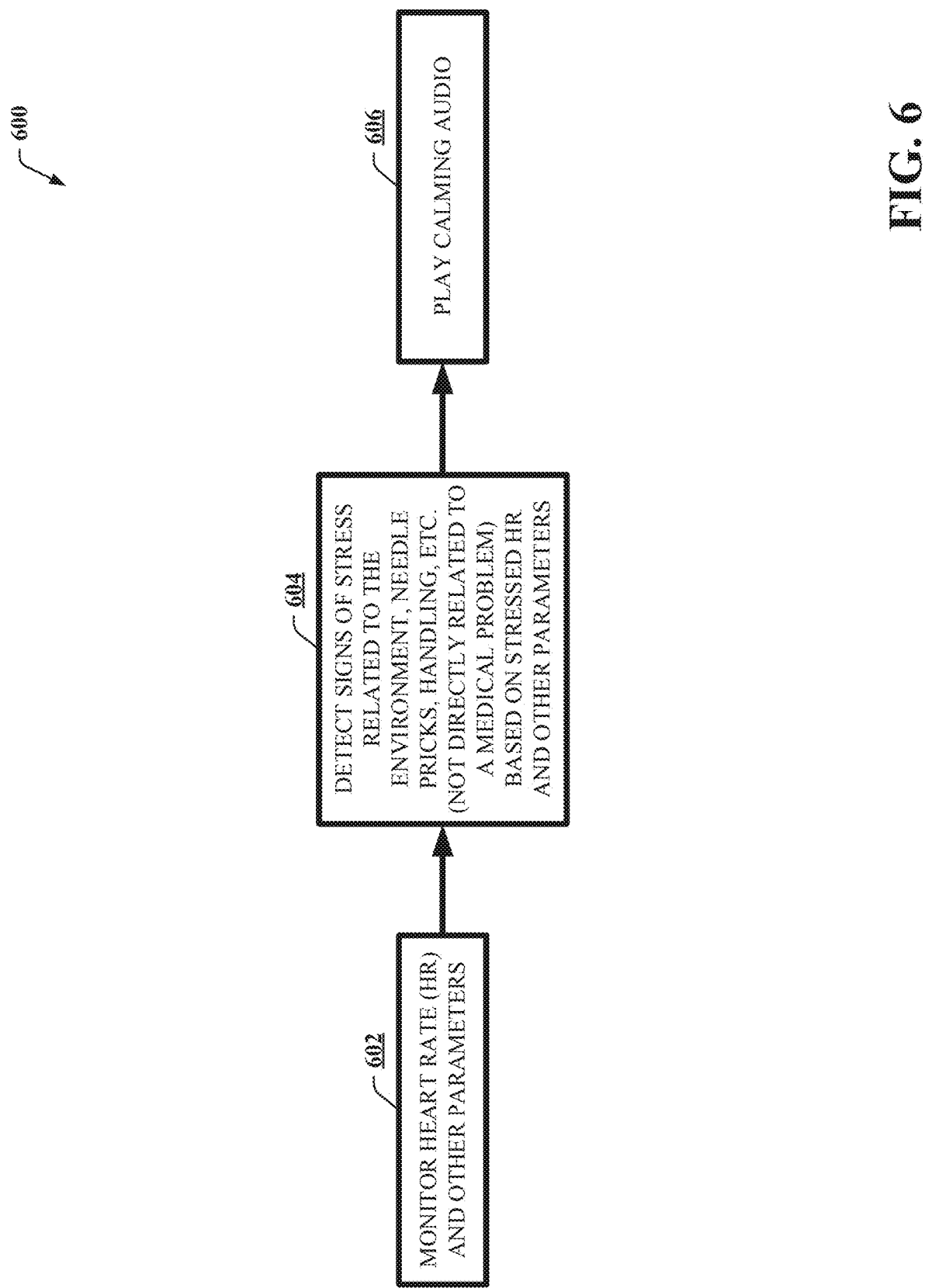
FIG. 6 illustrates a flow diagram of example, non-limiting method that can be employed to detect an unhealthy FHR in a preterm infant and transition the unhealthy FHR to a healthy FHR in accordance with one or more embodiments described herein.

FIG. 6 illustrates a flow diagram of example, non-limiting method 600 that can be employed to detect an unhealthy FHR in a preterm infant and transition the unhealthy FHR to a healthy FHR in accordance with one or more embodiments described herein. One or more operations described with reference to FIG. 6 can be performed by one or more components of non-limiting system 100. Repetitive description of like elements and/or processes employed in respective embodiments is omitted for sake of brevity.

Continuing from the embodiments described with reference to FIG. 5, the HR and other parameters of the preterm infant can be monitored via fetal monitoring, at 602. At 604, an entity (e.g., hardware, software, AI, neural network, machine and/or user) can attempt to detect signs of stress (not directly related to medical problems) in the preterm infant based on the environment of the preterm infant, due to needle pricks, handling of the preterm infant by a caregiver, etc. These signs of stress can be evaluated based on monitoring of the HR of the preterm infant as well as other parameters. If the preterm infant appears to be stressed based on the signs detected at 604, replaying component 114 can play the recorded sounds, at 606, after applying a level of modification to the recorded sounds appropriate to the gestational age of the preterm infant.

Figure 7:
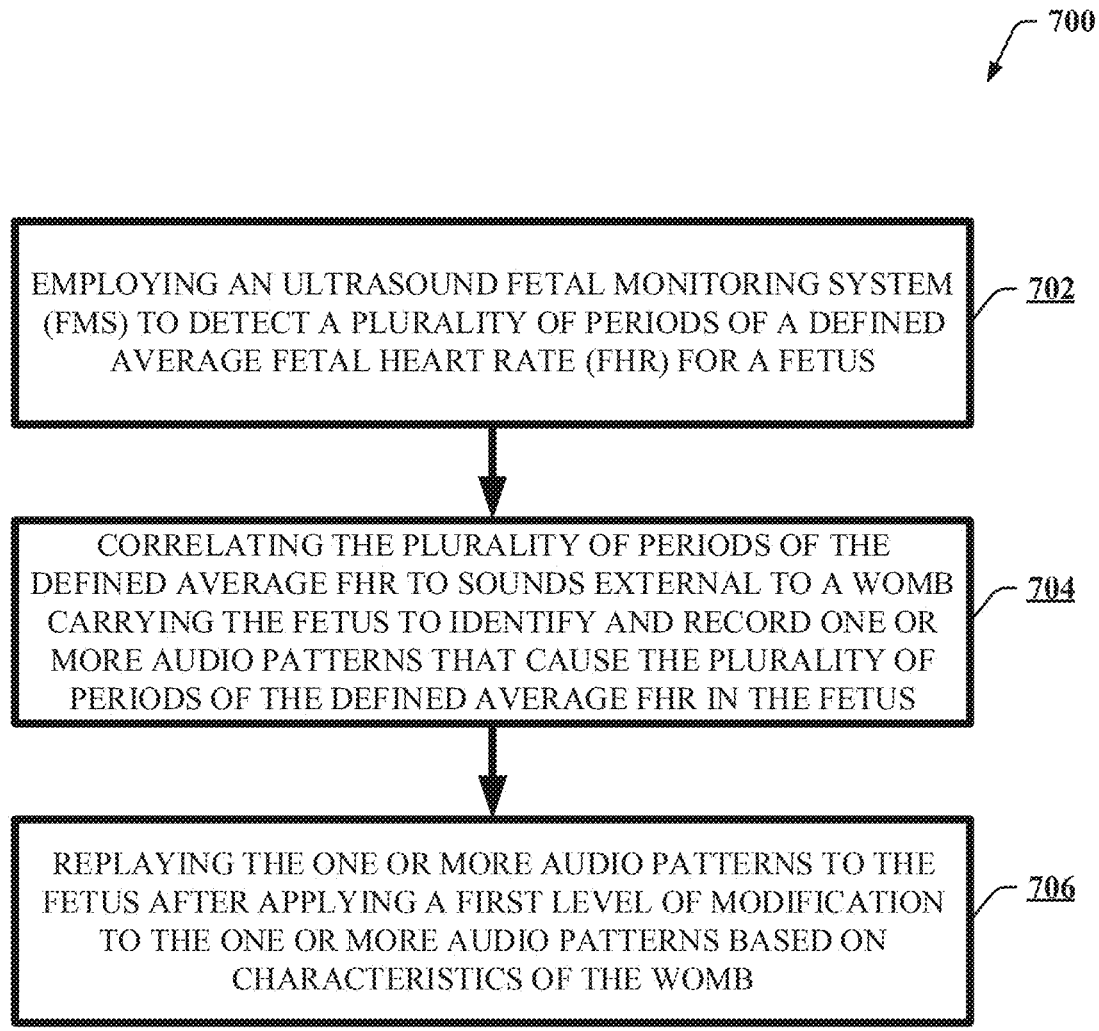
FIG. 7 illustrates a flow diagram of an example, non-limiting method that can identify and record sounds that can result in a healthy FHR in a fetus and replay the sounds to the fetus in accordance with one or more embodiments described herein.

FIG. 7 illustrates a flow diagram of an example, non-limiting method 700 that can identify and record sounds that can result in a healthy FHR in a fetus and replay the sounds to the fetus in accordance with one or more embodiments described herein. One or more operations described with reference to FIG. 7 can be performed by one or more components of non-limiting system 100. Repetitive description of like elements and/or processes employed in respective embodiments is omitted for sake of brevity.

At 702, non-limiting method 700 can comprise employing (e.g., by non-limiting system 100) an ultrasound FMS to detect a plurality of periods of a defined average FHR for a fetus.

At 704, non-limiting method 700 can comprise correlating (e.g., by speech signal processing component 110), the plurality of periods of the defined average FHR to sounds external to a womb carrying the fetus to identify and record one or more audio patterns that can cause the plurality of periods of the defined average FHR in the fetus.

At 706, non-limiting method 700 can comprise replaying (e.g., by replaying component 114), the one or more audio patterns to the fetus after applying a first level of modification to the one or more audio patterns based on characteristics of the womb.

Figure 8:
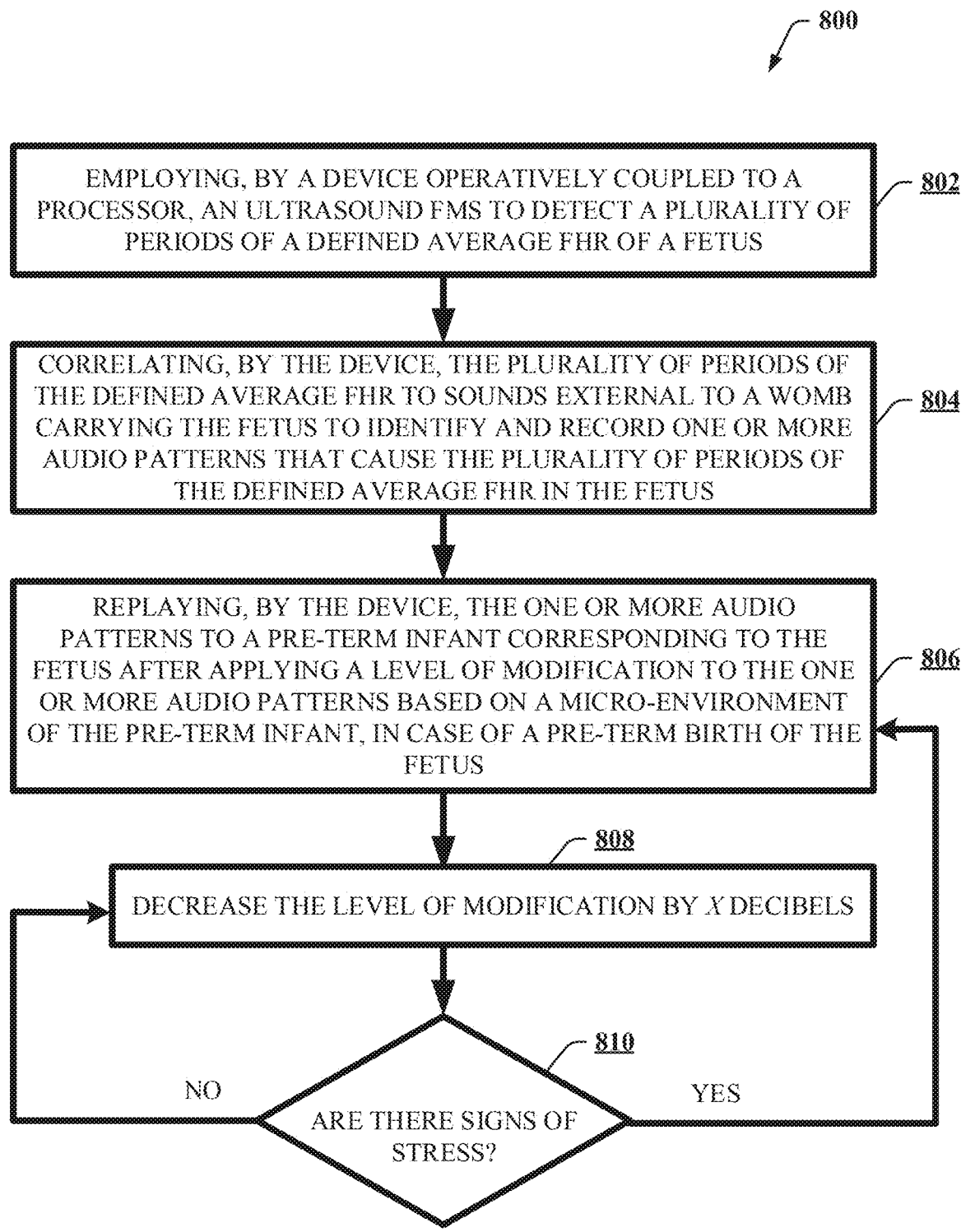
FIG. 8 illustrates a flow diagram of an example, non-limiting method that can identify and record sounds that can result in a healthy FHR in a preterm infant and replay the sounds to the preterm infant in accordance with one or more embodiments described herein.

FIG. 8 illustrates a flow diagram of an example, non-limiting method 800 that can identify and record sounds that can result in a healthy FHR in a preterm infant and replay the sounds to the preterm infant in accordance with one or more embodiments described herein. One or more operations described with reference to FIG. 8 can be performed by one or more components of non-limiting system 100. Repetitive description of like elements and/or processes employed in respective embodiments is omitted for sake of brevity.

At 802, non-limiting method 800 can comprise employing (e.g., by non-limiting system 100), by a device operatively coupled to a processor, an ultrasound FMS to detect a plurality of periods of a defined average FHR for a fetus.

At 804, non-limiting method 800 can comprise correlating (e.g., by speech signal processing component 110), by the device, the plurality of periods of the defined average FHR to sounds external to a womb carrying the fetus to identify and record one or more audio patterns that can cause the plurality of periods of the defined average FHR in the fetus.

At 806, non-limiting method 800 can comprise replaying (e.g., by replaying component 114), by the device, the one or more audio patterns to a preterm infant corresponding to the fetus after applying a level of modification to the one or more audio patterns based on a microenvironment of the preterm infant, in case of a preterm birth of the fetus.

At 808, non-limiting method 800 can comprise decreasing the level of modification (e.g., attenuation, etc.) of the one or more audio patterns by x decibels (dB) to transition the preterm infant from hearing attenuated sounds to unattenuated sounds. A reasonable value for x can be 1 dB. However, x can be anywhere between 1 dB and 5 dB, and the sound level cannot exceed 40 dB.

At 810, non-limiting method 800 can comprise determining whether any signs of stress can be detected in the preterm infant, for example, via monitoring of the HR of the preterm infant. If yes, non-limiting method 800 can return to replaying the modified audio patterns at 806. If not, non-limiting method 800 can continue to decreasing the level of modification of the one or more audio patterns at 808, until the preterm infant can become accustomed to unattenuated sounds.

Embodiments described herein can leverage ultrasound transducers to monitor the FHR for a fetus and to correlate the FHR to audio clips/patterns beneficial to the fetus, record and replay the audio clips to the fetus or to a corresponding preterm infant in a microenvironment in the case of a premature birth of the fetus, employ an estimate of abdominal features of the fetus's mother at different gestational ages to modulate the audio clips prior to replaying the audio clips to the fetus or to the preterm infant, and in case of the premature birth, systematically wean the baby (preterm infant) from in-womb audio to pure external audio without subjecting the baby to sudden stress and impaired neurodevelopment.

For simplicity of explanation, the computer-implemented and non-computer-implemented methodologies provided herein are depicted and/or described as a series of acts. It is to be understood that the subject innovation is not limited by the acts illustrated and/or by the order of acts, for example acts can occur in one or more orders and/or concurrently, and with other acts not presented and described herein. Furthermore, not all illustrated acts can be utilized to implement the computer-implemented and non-computer-implemented methodologies in accordance with the described subject matter. Additionally, the computer-implemented methodologies described hereinafter and throughout this specification are capable of being stored on an article of manufacture to enable transporting and transferring the computer-implemented methodologies to computers. The term article of manufacture, as used herein, is intended to encompass a computer program accessible from any computer-readable device or storage media.

The systems and/or devices have been (and/or will be further) described herein with respect to interaction between one or more components. Such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

Figure 9:
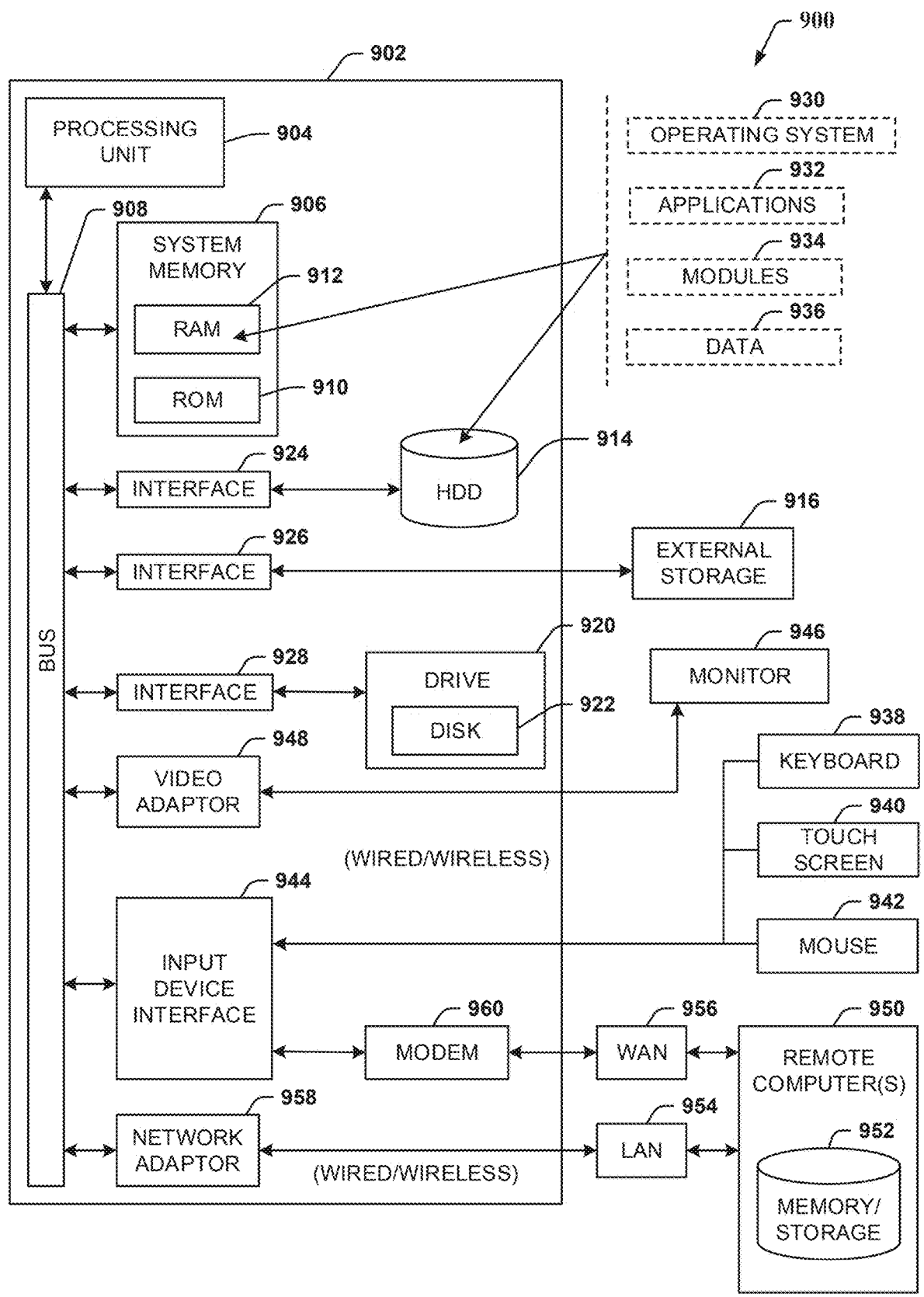
FIG. 9 illustrates a block diagram of an example, non-limiting operating environment in which one or more embodiments described herein can be facilitated.

In order to provide additional context for various embodiments described herein, FIG. 9 and the following discussion are intended to provide a brief, general description of a suitable computing environment 900 in which the various embodiments described herein can be implemented. While the embodiments have been described above in the general context of computer-executable instructions that can run on one or more computers, those skilled in the art will recognize that the embodiments can be also implemented in combination with other program modules or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multi-processor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 9, the example environment 900 for implementing various embodiments of the aspects described herein includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 includes ROM 910 and RAM 912. A basic input/output system (BIOS) can be stored in a non-volatile memory such as ROM, erasable programmable read only memory (EPROM), EEPROM, which BIOS contains the basic routines that help to transfer information between elements within the computer 902, such as during startup. The RAM 912 can also include a high-speed RAM such as static RAM for caching data.

The computer 902 further includes an internal hard disk drive (HDD) 914 (e.g., EIDE, SATA), one or more external storage devices 916 (e.g., a magnetic floppy disk drive (FDD) 916, a memory stick or flash drive reader, a memory card reader, etc.) and a drive 920, e.g., such as a solid state drive, an optical disk drive, which can read or write from a disk 922, such as a CD-ROM disc, a DVD, a BD, etc. Alternatively, where a solid state drive is involved, disk 922 would not be included, unless separate. While the internal HDD 914 is illustrated as located within the computer 902, the internal HDD 914 can also be configured for external use in a suitable chassis (not shown). Additionally, while not shown in environment 900, a solid state drive (SSD) could be used in addition to, or in place of, an HDD 914. The HDD 914, external storage device(s) 916 and drive 920 can be connected to the system bus 908 by an HDD interface 924, an external storage interface 926 and a drive interface 928, respectively. The interface 924 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 912, including an operating system 930, one or more application programs 932, other program modules 934 and program data 936. All or portions of the operating system, applications, modules, or data can also be cached in the RAM 912. The systems and methods described herein can be implemented utilizing various commercially available operating systems or combinations of operating systems.

Computer 902 can optionally comprise emulation technologies. For example, a hypervisor (not shown) or other intermediary can emulate a hardware environment for operating system 930, and the emulated hardware can optionally be different from the hardware illustrated in FIG. 9. In such an embodiment, operating system 930 can comprise one virtual machine (VM) of multiple VMs hosted at computer 902. Furthermore, operating system 930 can provide runtime environments, such as the Java runtime environment or the .NET framework, for applications 932. Runtime environments are consistent execution environments that allow applications 932 to run on any operating system that includes the runtime environment. Similarly, operating system 930 can support containers, and applications 932 can be in the form of containers, which are lightweight, standalone, executable packages of software that include, e.g., code, runtime, system tools, system libraries and settings for an application.

Further, computer 902 can be enabled with a security module, such as a trusted processing module (TPM). For instance, with a TPM, boot components hash next in time boot components, and wait for a match of results to secured values, before loading a next boot component. This process can take place at any layer in the code execution stack of computer 902, e.g., applied at the application execution level or at the OS kernel level, thereby enabling security at any level of code execution.

A user can enter commands and information into the computer 902 through one or more wired/wireless input devices, e.g., a keyboard 938, a touch screen 940, and a pointing device, such as a mouse 942. Other input devices (not shown) can include a microphone, an infrared (IR) remote control, a radio frequency (RF) remote control, or other remote control, a joystick, a virtual reality controller or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 904 through an input device interface 944 that can be coupled to the system bus 908, but can be connected by other interfaces, such as a parallel port, an IEEE 1394 serial port, a game port, a USB port, an IR interface, a BLUETOOTH® interface, etc.

A monitor 946 or other type of display device can be also connected to the system bus 908 via an interface, such as a video adapter 948. In addition to the monitor 946, a computer typically includes other peripheral output devices (not shown), such as speakers, printers, etc.

The computer 902 can operate in a networked environment using logical connections via wired or wireless communications to one or more remote computers, such as a remote computer(s) 950. The remote computer(s) 950 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 952 is illustrated. The logical connections depicted include wired/wireless connectivity to a local area network (LAN) 954 or larger networks, e.g., a wide area network (WAN) 956. Such LAN and WAN networking environments are commonplace in offices and companies, and facilitate enterprise-wide computer networks, such as intranets, all of which can connect to a global communications network, e.g., the Internet.

When used in a LAN networking environment, the computer 902 can be connected to the local network 954 through a wired or wireless communication network interface or adapter 958. The adapter 958 can facilitate wired or wireless communication to the LAN 954, which can also include a wireless access point (AP) disposed thereon for communicating with the adapter 958 in a wireless mode.

When used in a WAN networking environment, the computer 902 can include a modem 960 or can be connected to a communications server on the WAN 956 via other means for establishing communications over the WAN 956, such as by way of the Internet. The modem 960, which can be internal or external and a wired or wireless device, can be connected to the system bus 908 via the input device interface 944. In a networked environment, program modules depicted relative to the computer 902 or portions thereof, can be stored in the remote memory/storage device 952. It will be appreciated that the network connections shown are examples and other means of establishing a communications link between the computers can be used.

When used in either a LAN or WAN networking environment, the computer 902 can access cloud storage systems or other network-based storage systems in addition to, or in place of, external storage devices 916 as described above, such as but not limited to a network virtual machine providing one or more aspects of storage or processing of information. Generally, a connection between the computer 902 and a cloud storage system can be established over a LAN 954 or WAN 956 e.g., by the adapter 958 or modem 960, respectively. Upon connecting the computer 902 to an associated cloud storage system, the external storage interface 926 can, with the aid of the adapter 958 or modem 960, manage storage provided by the cloud storage system as it would other types of external storage. For instance, the external storage interface 926 can be configured to provide access to cloud storage sources as if those sources were physically connected to the computer 902.

The computer 902 can be operable to communicate with any wireless devices or entities operatively disposed in wireless communication, e.g., a printer, scanner, desktop or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 10:
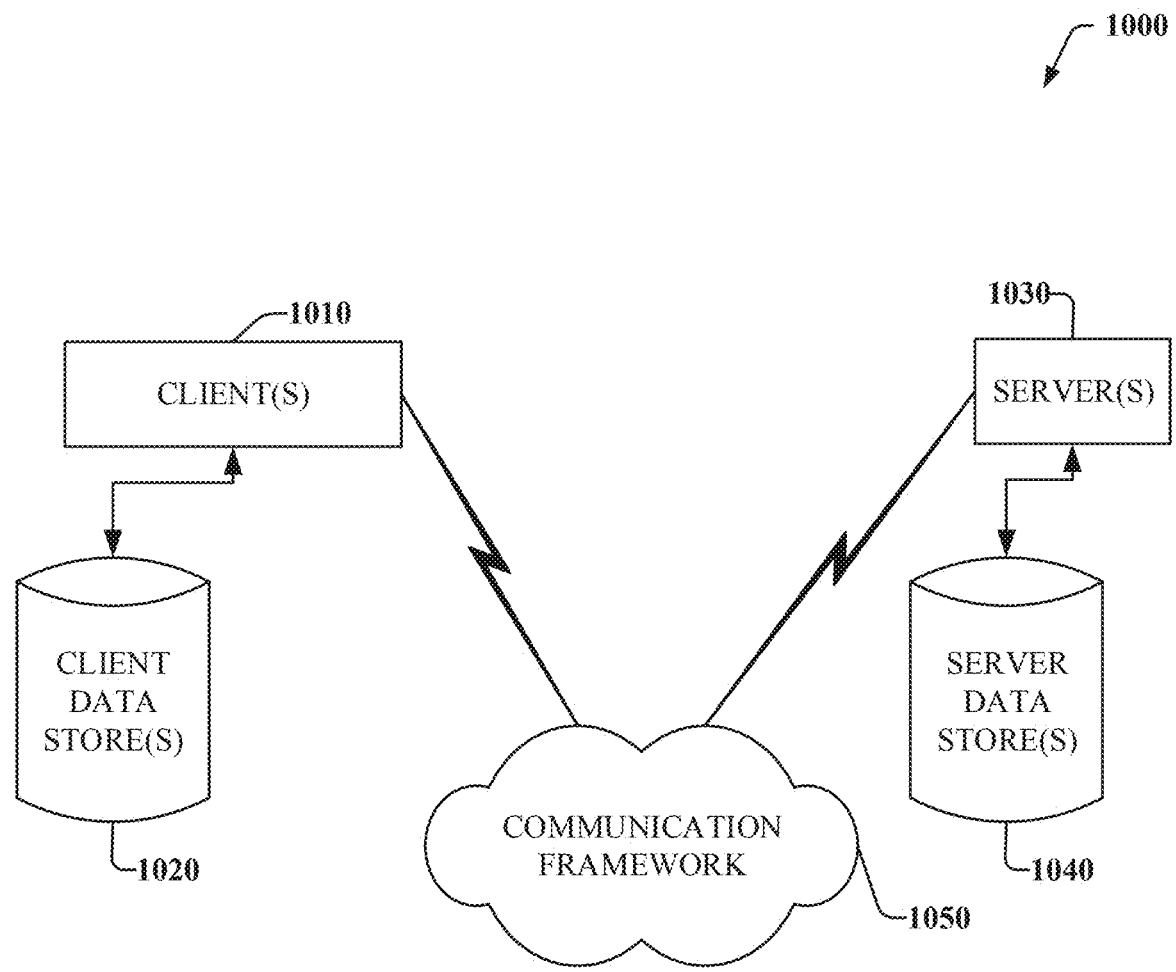
FIG. 10 illustrates an example networking environment operable to execute various implementations described herein.

FIG. 10 is a schematic block diagram of a sample computing environment 1000 with which the disclosed subject matter can interact. The sample computing environment 1000 includes one or more client(s) 1010. The client(s) 1010 can be hardware or software (e.g., threads, processes, computing devices). The sample computing environment 1000 also includes one or more server(s) 1030. The server(s) 1030 can also be hardware or software (e.g., threads, processes, computing devices). The servers 1030 can house threads to perform transformations by employing one or more embodiments as described herein, for example. One possible communication between a client 1010 and a server 1030 can be in the form of a data packet adapted to be transmitted between two or more computer processes. The sample computing environment 1000 includes a communication framework 1050 that can be employed to facilitate communications between the client(s) 1010 and the server(s) 1030. The client(s) 1010 are operably connected to one or more client data store(s) 1020 that can be employed to store information local to the client(s) 1010. Similarly, the server(s) 1030 are operably connected to one or more server data store(s) 1040 that can be employed to store information local to the servers 1030.

Various embodiments may be a system, a method, an apparatus or a computer program product at any possible technical detail level of integration. The computer program product can include a computer readable storage medium (or media) having computer readable program instructions thereon for causing a processor to carry out aspects of various embodiments. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network or a wireless network. The network can comprise copper transmission cables, optical transmission fibers, wireless transmission, routers, firewalls, switches, gateway computers or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various embodiments can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform various aspects.

Various aspects are described herein with reference to flowchart illustrations or block diagrams of methods, apparatus (systems), and computer program products according to various embodiments. It will be understood that each block of the flowchart illustrations or block diagrams, and combinations of blocks in the flowchart illustrations or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks. These computer readable program instructions can also be stored in a computer readable storage medium that can direct a computer, a programmable data processing apparatus, or other devices to function in a particular manner, such that the computer readable storage medium having instructions stored therein comprises an article of manufacture including instructions which implement aspects of the function/act specified in the flowchart or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart or block diagram block or blocks.

The flowcharts and block diagrams in the Figures illustrate the architecture, functionality, and operation of possible implementations of systems, methods, and computer program products according to various embodiments. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer or computers, those skilled in the art will recognize that this disclosure also can or can be implemented in combination with other program modules. Generally, program modules include routines, programs, components, data structures, etc. that perform particular tasks or implement particular abstract data types. Moreover, those skilled in the art will appreciate that various aspects can be practiced with other computer system configurations, including single-processor or multi-processor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, or a computer. By way of illustration, both an application running on a server and the server can be a component. One or more components can reside within a process or thread of execution and a component can be localized on one computer or distributed between two or more computers. In another example, respective components can execute from various computer readable media having various data structures stored thereon. The components can communicate via local or remote processes such as in accordance with a signal having one or more data packets (e.g., data from one component interacting with another component in a local system, distributed system, or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. As used herein, the term "and/or" is intended to have the same meaning as "or." Moreover, articles "a" and "an" as used in the subject specification and annexed drawings should generally be construed to mean "one or more" unless specified otherwise or clear from context to be directed to a singular form. As used herein, the terms "example" or "exemplary" are utilized to mean serving as an example, instance, or illustration. For the avoidance of doubt, the subject matter disclosed herein is not limited by such examples. In addition, any aspect or design described herein as an "example" or "exemplary" is not necessarily to be construed as preferred or advantageous over other aspects or designs, nor is it meant to preclude equivalent exemplary structures and techniques known to those of ordinary skill in the art.

The herein disclosure describes non-limiting examples. For ease of description or explanation, various portions of the herein disclosure utilize the term "each," "every," or "all" when discussing various examples. Such usages of the term "each," "every," or "all" are non-limiting. In other words, when the herein disclosure provides a description that is applied to "each," "every," or "all" of some particular object or component, it should be understood that this is a non-limiting example, and it should be further understood that, in various other examples, it can be the case that such description applies to fewer than "each," "every," or "all" of that particular object or component.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DR-RAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a processor that executes computer-executable instructions stored in memory that, when executed by the processor, facilitate performance of operations comprising:
   employing an ultrasound fetal monitoring system (FMS) to detect a plurality of periods of a defined average fetal heart rate (FHR) for a fetus;
   correlating the plurality of periods of the defined average FHR to sounds external to a womb carrying the fetus to identify and record one or more audio patterns that cause the plurality of periods of the defined average FHR in the fetus; and
   replaying the one or more audio patterns to the fetus after applying a first level of modification to the one or more audio patterns based on characteristics of the womb.

2. The system of claim 1, wherein the operation of detecting the plurality of periods of the defined average FHR comprises:
   monitoring an FHR of the fetus when a mother carrying the fetus is in a calm state to identify a healthy FHR for the fetus and when the mother is in a stressed state to identify an unhealthy FHR for the fetus;
   monitoring the FHR of the fetus during restful states of the fetus to identify the healthy FHR and the unhealthy FHR for the fetus; and
   employing the healthy FHR for the fetus to determine the defined average FHR.

3. The system of claim 1, wherein the operation of identifying the one or more audio patterns comprises:
   identifying first sounds that cause a healthy FHR in the fetus or cause the fetus to transition to the healthy FHR; and
   identifying second sounds that cause an unhealthy FHR in the fetus or cause the fetus to transition to the unhealthy FHR.

4. The system of claim 1, wherein the first level of modification is based on different developmental stages of the fetus inside the womb and on changes in abdominal features corresponding to the womb.

5. The system of claim 1, wherein the replaying is configured to maintain a healthy physiological state of the fetus.

6. The system of claim 1, wherein the operations further comprise:
   replaying the one or more audio patterns to a preterm infant corresponding to the fetus after applying a second level of modification to the one or more audio patterns based on a microenvironment of the preterm infant, in case of a preterm birth of the fetus.

7. The system of claim 6, wherein the second level of modification is based on an estimate of pre-birth audio patterns that the preterm infant is expected to hear as the fetus at different developmental stages inside the womb, and wherein the pre-birth audio patterns are estimated by analyzing abdominal features corresponding to the womb.

8. The system of claim 1, wherein the operations further comprise:
   employing one or more additional ultrasound FMSs to detect respective periods of defined average FHRs of one or more additional fetuses in the womb to correlate the respective periods of defined average FHRs to the sounds external to the womb and to identify and record respective audio patterns that cause the respective periods of defined average FHRs in the one or more additional fetuses.

9. The system of claim 8, wherein the operations further comprise:
   replaying the respective audio patterns to the one or more additional fetuses after modifying the respective audio patterns based on the characteristics of the womb.

10. A computer-implemented method, comprising:
    employing, by a device operatively coupled to a processor, an ultrasound FMS to detect a plurality of periods of a defined average FHR for a fetus;
    correlating, by the device, the plurality of periods of the defined average FHR to sounds external to a womb carrying the fetus to identify and record one or more audio patterns that cause the plurality of periods of the defined average FHR in the fetus; and
    replaying, by the device, the one or more audio patterns to a preterm infant corresponding to the fetus after applying a level of modification to the one or more audio patterns based on a microenvironment of the preterm infant, in case of a preterm birth of the fetus.

11. The computer-implemented method of claim 10, wherein the detecting the plurality of periods of the defined average FHR comprises:
    monitoring an FHR of the fetus when a mother carrying the fetus is in a calm state to identify a healthy FHR for the fetus and when the mother is in a stressed state to identify an unhealthy FHR for the fetus;
    monitoring the FHR of the fetus during restful states of the fetus to identify the healthy FHR and the unhealthy FHR for the fetus; and
    employing the healthy FHR for the fetus to determine the defined average FHR.

12. The computer-implemented method of claim 10, wherein the identifying the one or more audio patterns comprises:

identifying first sounds that cause a healthy FHR in the fetus or cause the fetus to transition to the healthy FHR; and identifying second sounds that cause an unhealthy FHR in the fetus or cause the fetus to transition to the unhealthy FHR.

13. The computer-implemented method of claim 10, wherein the replaying augments neurological development and physiological development of the preterm infant.

14. The computer-implemented method of claim 10, wherein the level of modification is estimated based on an estimate of pre-birth audio patterns that the preterm infant is expected to hear as the fetus at different developmental stages inside the womb.

15. The computer-implemented method of claim 14, wherein the pre-birth audio patterns are estimated by analyzing abdominal features corresponding to the womb.

16. The computer-implemented method of claim 14, wherein the estimating of the level of modification comprises:

employing a tissue mimicking phantom to measure an audio signal corresponding to a broad spectrum sound for different physiological parameters of a mother carrying the fetus.

17. The computer-implemented method of claim 10, further comprising:

determining, by the device, an optimum time to transition the one or more audio patterns from attenuated sound to unattenuated sound to assist the preterm infant in transitioning from hearing pre-birth audio patterns to hearing post-birth audio patterns.

18. The computer-implemented method of claim 17, wherein the determining comprises:

intermittently observing responses of the preterm infant to the unattenuated sound.

19. A computer program product comprising a non-transitory computer readable memory having program instructions embodied therewith, the program instructions executable by a processor to cause the processor to:

employ an ultrasound FMS to detect a plurality of periods of a defined average FHR for a fetus;

correlate the plurality of periods of the defined average FHR to sounds external to a womb carrying the fetus to identify and record one or more audio patterns that cause the plurality of periods of the defined average FHR in the fetus; and replay the one or more audio patterns to the fetus after applying a first level of modification to the one or more audio patterns based on characteristics of the womb.

20. The computer program product of claim 19, wherein the program instructions are further executable by the processor to cause the processor to:

replay the one or more audio patterns to a preterm infant corresponding to the fetus after applying a second level of modification to the one or more audio patterns based on an estimate of pre-birth audio patterns that the preterm infant is expected to hear as the fetus at different developmental stages inside the womb.

* * * * *